United States Patent
Fattouche et al.

(10) Patent No.: US 6,266,014 B1
(45) Date of Patent: Jul. 24, 2001

(54) METHODS AND APPARATUS TO POSITION A MOBILE RECEIVER USING DOWNLINK SIGNALS PART IV

(75) Inventors: Michel Fattouche; Richard Klukas; Kevin Oler, all of Calgary (CA)

(73) Assignee: Cell-Loc Inc., Calgary (CA)

( * ) Notice: Subject to any disclaimer, the term of this patent is extended or adjusted under 35 U.S.C. 154(b) by 0 days.

(21) Appl. No.: 09/169,690

(22) Filed: Oct. 9, 1998

(51) Int. Cl.[7] ............... G01S 3/02; H04B 1/10; H04Q 7/20
(52) U.S. Cl. ............... 342/450; 375/350; 455/456
(58) Field of Search ............... 455/456, 422; 342/450, 457, 463, 464, 357.01, 357.02, 357.06; 375/350

(56) References Cited

U.S. PATENT DOCUMENTS

| | | | |
|---|---|---|---|
| 3,384,891 | 5/1968 | Anderson | 343/6.5 |
| 3,646,580 | 2/1972 | Fuller et al. | 325/53 |
| 3,680,121 | 7/1972 | Anderson et al. | 343/112 |
| 4,177,466 | 12/1979 | Reagan | 343/112 |
| 4,297,701 | 10/1981 | Henriques | 343/6.5 |
| 4,433,335 | 2/1984 | Wind | 343/463 |
| 4,596,988 | 6/1986 | Wanka | 343/457 |
| 4,638,321 | 1/1987 | Drogin | 342/444 |
| 4,639,733 | 1/1987 | King et al. | 342/424 |
| 4,651,156 | 3/1987 | Martinez | 342/457 |
| 4,651,157 | 3/1987 | Gray et al. | 342/457 |
| 4,728,959 | 3/1988 | Maloney et al. | 342/457 |
| 4,742,357 | 5/1988 | Rackley | 342/457 |
| 4,791,572 | 12/1988 | Green, III et al. | 364/449 |
| 4,797,679 | 1/1989 | Cusdin et al. | |
| 4,818,998 | 4/1989 | Apsell et al. | 342/44 |
| 4,870,422 | 9/1989 | Counselmann, III | 342/357 |
| 4,891,650 | 1/1990 | Sheffer | 342/457 |
| 4,908,629 | 3/1990 | Apsell et al. | 342/457 |
| 4,916,455 | 4/1990 | Bent et al. | 342/457 |
| 4,926,161 | 5/1990 | Cupp | 340/572 |
| 4,975,710 | 12/1990 | Baghdady | 342/442 |
| 5,003,317 | 3/1991 | Gray et al. | 342/457 |

(List continued on next page.)

FOREIGN PATENT DOCUMENTS

| | | |
|---|---|---|
| 2108103 | 4/1995 | (CA) . |
| WO 93/06685 | 4/1993 | (WO) . |
| PCT/US97-15892 | 3/1998 | (WO) . |

OTHER PUBLICATIONS

FCC Rules to Implement Enhanced 911 for Wireless Services announcement, 1996.

An overview of the challenges and progress in meeting the E–911 requirement for location service, Reed, J.H.; Krizman, K.J.; Woerner, B.D.; Rappaport, T.S. IEEE Communications Magazine, vol. 36 4, Apr. 1998, pp. 3.

Krizman, Kevin J. et al., *Wireless Position Location: Fundamentals, Implementation Strategies, and Sources of Error*, Virginia Tech, Bradley Dept. of Electrical Engineering, pp. 919–923, Apr. 4, 1997.

(List continued on next page.)

*Primary Examiner*—Thomas H. Tarcza
*Assistant Examiner*—Fred H Mull
(74) *Attorney, Agent, or Firm*—Christensen O'Connor Johnson Kindness PLLC

(57) ABSTRACT

The invention consists of methods and apparatus to estimate the position and velocity of a Mobile Receiver (MR) using either the Time Of Arrival (TOA) of signals received by the MR, their Phase Of Arrival (POA), their Strength Of Arrival (SOA), their Frequency Of Arrival (FOA), or a combination thereof, with respect to a reference produced by a Reference Receiver (RR) of known location. In order to solve for the coordinates of the MR, the invention uses either hyperbolic multilateration based on Time Difference Of Arrival (TDOA), or linear multiangulation based on Phase Difference Of Arrival (PDOA), or both. In order to solve for the velocity of the MR, the patent uses FOA based on Frequency Difference Of Arrival (FDOA).

29 Claims, 17 Drawing Sheets

U.S. PATENT DOCUMENTS

| | | | |
|---|---|---|---|
| 5,008,679 | 4/1991 | Effland et al. | 342/353 |
| 5,023,809 | 6/1991 | Spackman et al. | 364/516 |
| 5,023,900 | 6/1991 | Tayloe et al. | 379/32 |
| 5,055,851 | 10/1991 | Sheffer | 342/457 |
| 5,095,500 | 3/1992 | Tayloe et al. | 379/32 |
| 5,101,501 | 3/1992 | Gilhousen et al. | 455/33 |
| 5,126,748 | 6/1992 | Ames et al. | 342/353 |
| 5,128,623 | 7/1992 | Gilmore | 338/14 |
| 5,153,902 | 10/1992 | Buhl et al. | 379/57 |
| 5,166,694 | 11/1992 | Russell et al. . | |
| 5,173,710 | 12/1992 | Kelley et al. | 342/463 |
| 5,208,756 | 5/1993 | Song | 364/449 |
| 5,218,618 | 6/1993 | Sagey | 375/1 |
| 5,293,642 | 3/1994 | Lo . | |
| 5,293,645 | 3/1994 | Sood | 455/54.1 |
| 5,317,323 | 5/1994 | Kennedy et al. | 342/457 |
| 5,327,144 | 7/1994 | Stilp et al. | 342/457 |
| 5,404,376 | 4/1995 | Dent | 375/200 |
| 5,412,388 | 5/1995 | Attwood | 701/207 |
| 5,418,537 | 5/1995 | Bird . | |
| 5,508,708 | 4/1996 | Ghosh et al. | 342/457 |
| 5,541,608 | 7/1996 | Murphy et al. . | |
| 5,570,305 | 10/1996 | Fattouche et al. . | |
| 5,600,706 | 2/1997 | Dunn et al. | 379/59 |
| 5,614,914 | 3/1997 | Bolgiano et al. . | |
| 5,629,707 | 5/1997 | Heuvel et al. . | |
| 5,646,632 | 7/1997 | Khan et al. | 342/375 |
| 5,663,734 | 9/1997 | Krasner | 342/357 |
| 5,666,662 | 9/1997 | Shibuya | 455/456 |
| 5,701,328 | 12/1997 | Schuchman et al. . | |
| 5,719,584 | 2/1998 | Otto | 342/465 |
| 5,724,660 | 3/1998 | Kauser et al. | 455/456 |
| 5,734,674 | 3/1998 | Fenton et al. . | |
| 5,736,964 | 4/1998 | Ghosh et al. | 342/457 |
| 5,758,288 | 5/1998 | Dunn et al. . | |
| 5,764,188 | 6/1998 | Ghosh et al. | 342/457 |
| 5,764,687 | 6/1998 | Easton | 375/206 |
| 5,781,156 | 7/1998 | Krasner | 342/357 |
| 5,844,522 | 12/1998 | Sheffer et al. . | |
| 5,883,598 | 3/1999 | Parl et al. . | |
| 5,973,643 | 10/1999 | Hawkes et al. . | |
| 5,977,913 | 11/1999 | Christ . | |
| 5,987,329 | 11/1999 | Yost et al. . | |
| 5,999,126 | 12/1999 | Ito . | |
| 6,031,490 | 2/2000 | Forssen . | |
| 6,047,192 | 4/2000 | Maloney et al. . | |

OTHER PUBLICATIONS

Spilker, J.J. Jr., "GPS Signal Structure and Performance Characteristics," Global Positioning System, vol. I, The Institute of Navigation, Washington D.C., 1980, reprinted by The Institute of Navigation, Alexandria, Virginia, pp. 29–54.

Haykin, S. "Adaptive Filter Theory," Second Edition, Prentice Hall, Englewood Cliffs, NJ, 1991, pp. 449–450.

Haykin, S. "An Introduction to Analog and Digital Communications," John Wiley & Sons, New York, 1989, pp. 327–332.

Vanicek, P. and Krakiwsky, E.J., "Geodesy: The Concepts," North–Holland Publishing Company, Amsterdam, 1982, p. 214, pp. 231–239.

Chaffee, J.W. and Abel, J.S., "Bifurcation of Pseudorange Equations," Proceedings of the 1993 National Technical Meeting, San Francisco, California, Jan. 20–22, 1993, The Institute of Navigation, pp. 203–211.

Schau, H.C. and Robinson, A.Z., "Passive Source Localization Employing Intersecting Spherical Surfaces from Time-of-Arrival Differences," IEEE Transactions on Acoustics, Speech, and Signal Processing, vol. ASSP–35, No. 8, Aug. 1987, pp. 1223–1225.

Bancroft, S., "An Algebraic Solution of the GPS Equations," IEEE Transactions on Aerospace and Electronic Systems, vol. AES–21, No. 7, Jan. 1985, pp. 56–59.

Chan, Y.T. and Ho, K.C., "A Simple and Efficient Estimator for Hyperbolic Location," IEEE Transactions on Signal Processing, vol. 42, No. 8, Aug. 1994, pp. 1905–1915.

Schmidt, R.O., "A New Approach to Geometry of Range Difference Location," IEEE Transactions on Aerospace and Electronic Systems, vol. AES–8, No. 6, Nov. 1972, pp. 821–835.

Hofmann–Wellenhof, B. et al., "Global Positioning System Theory and Practice," Second Edition, Springer–Verlag Wien, New York, copyright 1992 and 1993, pp. 79–88, pp. 190–215.

Krakiwsky, E.J., "The Method of Least Squares: A Synthesis of Advances," Department of Surveying Engineering, The University of Calgary, Calgary, Alberta, Aug. 1990, pp. 7–23.

Steeves, R.R. and Fraser, C.S., "Statistical Post–Analysis of Least Squares Adjustment Results," Papers For The CISM Adjustment And Analysis Seminars, Second Edition, Jan. 1987, pp. 182–210.

Van Dierendonck, A.J., and Melton, W.C., "Applications of Time Transfer Using NAVSTAR GPS," Global Positioning System, vol. II, The Institute of Navigation, Washington, D.C., 1984, pp. 133–146.

Abstract of U.S. Patent No. 5,379,047, Yokev et al, Jan. 3, 1995, 3 pages.

Abstract of U.S. Patent No. 5,583,517, Yokev et al, Dec. 10, 1996, 3 pages.

Abstract of U.S. Patent No. 5,537,460, Holliday, Jr., et al, Jul. 16, 1996, 2 pages.

Abstract of U.S. Patent No. 4,740,792, Sagey, et. al., Apr. 26, 1988, 2 pages.

Abstract of U.S. Patent No. 5,335,246, Yokev, et. al., Aug. 2, 1994, 4 pages.

Abstract of U.S. Patent No. 5,365,451, Wang, et. al., Nov. 15, 1994, 2 pages.

Abstract of U.S. Patent No. 5,519,760, Borkowski, et. al., May 21, 1996, 2 pages.

Abstract of U.S. Patent No. 5,519,621, Wortham, May 21, 1996, 4 pages.

Abstract of U.S. Patent No. 5,490,203, Feb. 6, 1996, 2 pages.

Abstract of U.S. Patent No. 5,365,516, Nov. 15, 1994, 3 pages.

Abstract of U.S. Patent No. 5,166,694, Nov. 24, 1992, 2 pages.

Abstract of U.S. Patent No. 5,119,102, Jun. 2, 1992, 1 page.

Abstract of U.S. Patent No. 4,700,374, Oct. 13, 1987, 2 pages.

Abstract of U.S. Patent No. 4,665,404, May 12, 1987, 2 pages.

Abstract of U.S. Patent No. 4,359,733, Nov. 16, 1982, 3 pages.

Abstract of U.S. Patent No. 5,280,457, Jan. 18, 1994, 2 pages.

Abstract of U.S. Patent No. 4,799,062, Jan. 17, 1989, 3 pages.

Abstract of U.S. Patent No. 5,218,367, Jun. 8, 1993, 2 pages.

Abstract of U.S. Patent No. 5,293,642, Mar. 8, 1994, 1 page.

Abstract of U.S. Patent No. 5,479,482, Dec. 26, 1995, 2 pages.

Abstract of U.S. Patent No. 5,418,537, May 23, 1995, 2 pages.

Smith, Jr. William Whitfield, School of Electrical Engineering, Georgia Institute of Technology, Atlanta, Georgia, Passive Location of Mobile Cellular Telepohone Terminals, IEEE, CH3031–2/91/000–0221,1.001991.

Hata, M., "Empirical Formula for Radio Propagation Loss in Land Mobile Radio Services," IEEE Transactions on Vehicular Technology, vol. VT–29, No. 3, Aug. 1980.

Dumont, L.R., et al., "Super–resolution of Multipath Channels in a Spread Spectrum Location System," IEEE Electronic Letters, vol. 30, No. 19, pp. 1583–1584, Sep. 15, 1994.

Schmidt, R., "Least Squares Range Difference Location," IEEE Transactions on Aerospace and Electronic Systems, vol. 32, No. 1, Jan. 1996.

Turin, G.L. et al., "A Statistical Model of Urban Multipath Propagation," IEEE Transactions on Vehicular Technology, vol. VT–21, No. 1, Feb. 1972.

Smith, J.O. et al., "Closed–Form Least–Squares Source Location Estimation from Range–Difference Measurements," IEEE Transactions on Acoustics, Speech, and Signal Processing, vol. ASSP–35, No. 12, Dec. 1987.

Ziskind, I. et al., "Maximum Likelihood Localization of Multiple Sources by Alternating Projection," IEEE Transactions on Acoustics, Speech, and Signal Processing, vol. ASSP–36, No. 10, Oct. 1988.

Morley, G.D. et al., "Improved Location Estimation with Pulse–ranging in Presence of Shadowing and Multipath Excess–delay Effects," Electronics Letters, vol. 31, No. 18, pp. 1609–1610, Aug. 1995.

METHODS AND APPARATUS TO POSITION A MOBILE RECEIVER USING DOWNLINK SIGNALS PART IV

FIELD OF THE INVENTION

This invention relates to location finding and tracking of a Mobile Receiver (MR) using a Reference Receiver (RR) of known location.

BACKGROUND OF THE INVENTION

Whenever a number of signals are available for reception to the MR as well as to the RR, it is possible to locate the MR. Examples of radio signals that exist with worldwide coverage are satellite signals such as Global Positioning System (GPS), Iridium, Gobalstar, etc. Examples of radio signals that can penetrate structures such as buildings are land-based systems such as cellular, PCS, paging, and ESMR, among others. Both satellite-based signals and terrestrial-based signals can be sued to located the MR by relying on their reception at both the MR and the RR. In this patent, we refer to such a location system as a handset-based Wireless Location System (WLS) (or Forward/downlink-based WLS), as opposed to a network-based WLS (or Reverse/uplink-based WLS), which locates a Mobile Transmitter (MT) using a plurality of receivers that receive the signal transmitted from the MT. An advantage of a network-based WLS is that it can be passive (in that it can locate MR's without modification or addition to wireless transmissions) and that no modifications to the hardware or operation of the MT are required for the WLS to locate the MT. On the other hand, a handset-based WLS has the advantage of requiring no modification of existing network infrastructure. The location in the handset-based WLS can be performed either at the MR, or at the RR, or at a Third Receiver (TR). When the location is performed at the MR, the RR is required to transmit the Reference Information to the MR. When the location is performed at the RR, the MR is required to transmit the Location Information to the RR. When the location is performed at the TR, both the MR and the RR are required to transmit their corresponding information to the TR.

Radio signals can interfere with one another unless multiple access techniques are employed. Existing radio signals use any one of a number of multiple access techniques such as: Code Division Multiple Access (CDMA), Time Division Multiple Access (TDMA) and Frequency Division Multiple Access (FDMA). CDMA is used in IS-95, the North American standard for TDMA CTs, and in GSM, the European standard for TDMA CTs. Without loss of generality, we will use in this patent GPS signals as an example of a satellite-based radio signal and IS-95 signals as an example of a land-based radio signal. This choice does not preclude any other standard or any other multiple access technique. In this patent, we refer to a transmitter as a Base Station Transmitter (BST). It is important to note that a RR is not required in this patent if the BSTs are referenced to the same reference signal.

The need for wireless location finding and tracking of MRs is ever increasing. Some of the possible services for locating MRs are:

1. Enhanced Emergency Services: In recent years pressure has been mounting for the development of technology to position Cellular Telephones (CTs). The primary driving force has ben enhanced 911 (E911) services for wireless telephone subscribers. E911 services provide the 911 operator with information such as calling number, street address, and the primary subscriber's name. A ruling concerning E911 emergency calling systems was released by the FCC in October, 1996 and clarified in December 1997. In the document, the FCC requires that by October 2001, wireless 911 caller be located with a horizontal accuracy of 125 meters RMS (Root Mean Square).
2. Tracking of Fraudulent Calls.
3. Tracking of Stolen Vehicles: Conventionally, to track stolen vehicles requires installing an RF tag such as in Bird, U.S. Pat. No. 5,418,537 issued May 23, 1995, leaving it permanently on in each vehicle to be tracked and a new infrastructure for the BSs throughout the desired service area. An alternative solution is to either use existing CTs to take advantage of the existing cellular coverage and the broad availability of inexpensive CTs, or to use GPS receivers to take advantage of the availability and accuracy of satellite signals.
4. Fleet Management for Courier and Transportation Businesses: Once again, to manage a fleet requires installing a RF tag such as in Song, U.S. Pat. No. 5,208,756 issued May 4, 1993, and Sheffer et al., U.S. Pat. No. 5,218,367 issued Jun. 8, 1993. Instead, existing CTs can be used to take advantage of the existing cellular coverage and the broad availability of inexpensive CTs. Alternatively, GPS receivers can be used to take advantage of the availability and accuracy of satellite signals.
5. Location-sensitive billing.

Without loss of generality, we will assume throughout this document that the intention of the handset-based WLS is to estimate the horizontal position of the MR as well as its horizontal velocity. In case both the vertical and the horizontal position of a MR are to be estimated, an extra independent measurement is required in addition to the minimum number required for horizontal positioning.

DESCRIPTION OF THE FIGURES

Preferred embodiments of the invention will be described with reference to the Figures, by way of example, and without intending to limit the invention to the specific embodiments disclosed, in which Figures like reference characters denote like elements, and in which.

When the BST (102) corresponds to an IS-95-based sector in a BS, the signal, $s_i(t)$ (103), can be a pilot signal, a sync signal, a paging signal or a Forward Traffic signal. When $s_i(t)$ is a pilot signal, it consists of a single code, repeated exactly 75 times every 2 seconds, with a period of 32,768 chips. The pilot code is known as the "pilot PH sequence" or the "short code". Although in IS-95 all sectors broadcast the same short code, the pilot transmitted by each sector is time-offset by an integral multiple of 64 chips from any other pilot signal which could forseeably be simultaneously received by a MR. As the code has a period of 32,768 chips, and pilots are spaced by 64 chips, there are 512 unique pilot phases possible.

When the BST (102) corresponds to a GPS-based satellite, the signal $s_i(t)$ (103), can be either a Coarse Acquisition (CA) signal or a Precision signal. When $s_i(t)$ is a CA signal, it consists of a unique Gold code per satellite (i.e. up to 24 distinct codes), repeated exactly 1000 time every 1 second, with a period of 1023 chips, with BPSK overhead messages at 50 bits/second. The codes are known as the "CA-codes".

When the BST (102 corresponds to an AMPs-based sector or an IS-136/GSM-based sector in a BS, the signal, $s_t(t)$ (103), can be a Forward Control Channel (FOCC) signal or a Forward Voice Channel (FVC) signal. When $s_t(t)$ is a FOCC signal, it consists of Digital colour Codes (DCCs) with overhead messages regarding the channel numbers of the paging channels. Each DCC consists of known data, unique to its corresponding servicing sector, interspersed with overhead messages.

Figure 1:
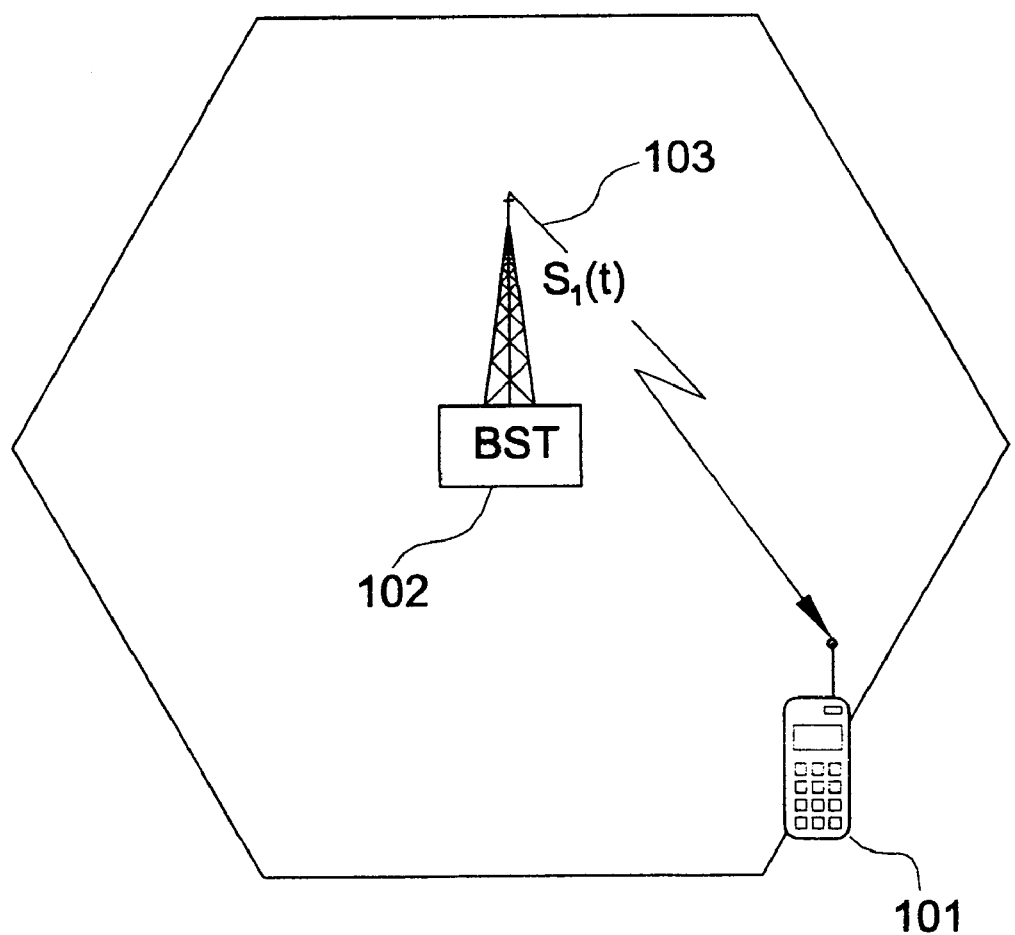
FIG. 1 illustrates the broadcast of a signal $s_i(t)$ (103), by the $i^{th}$ BST (102) where $\tau_{o,i}$ is the Time of Transmission (TOT) of the signal. A MR (101) receives the signal, together with other signals transmitted from a number of BSTs.
Figure 2:
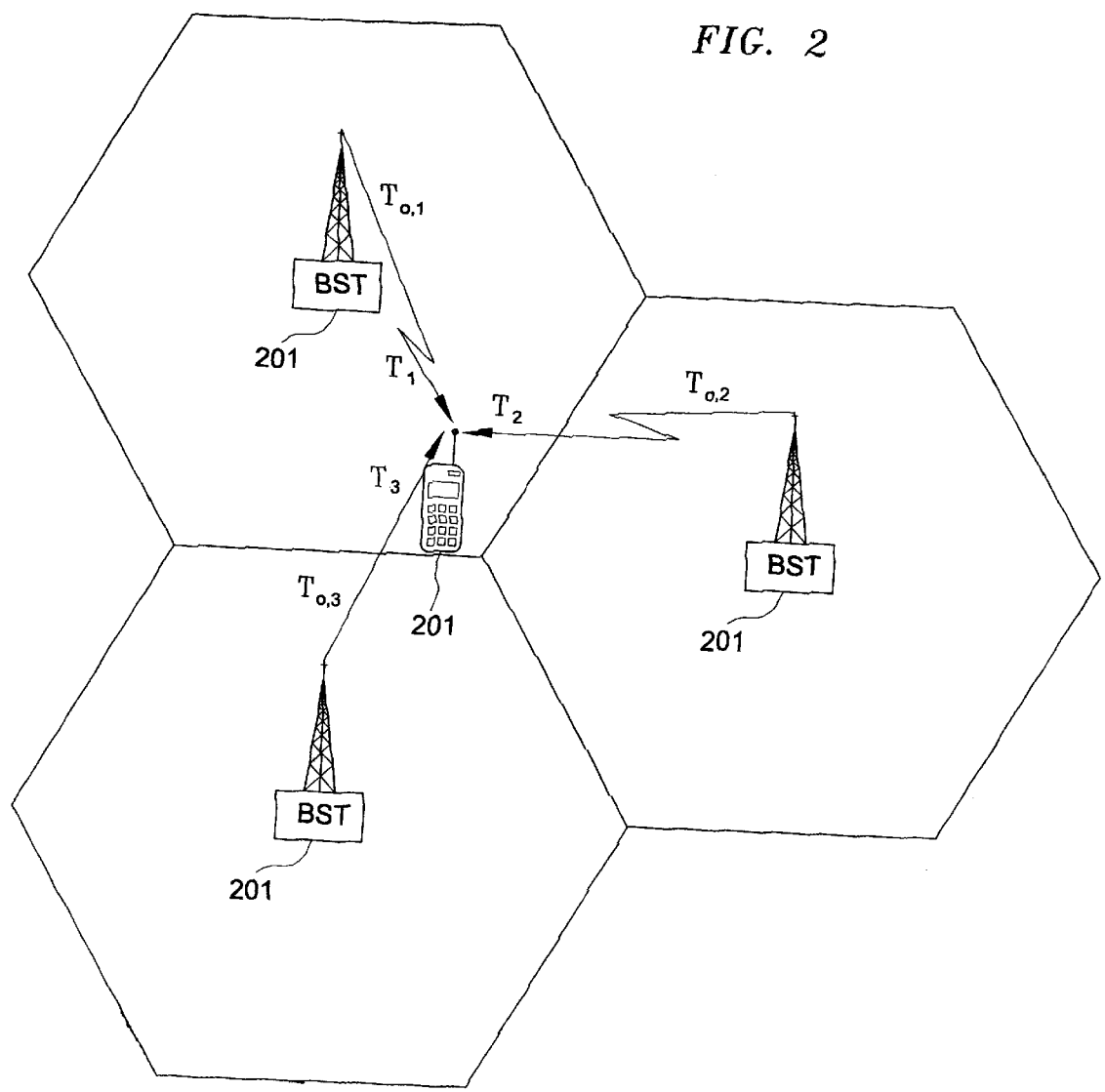

Following FIG. 1,

FIG. 2 illustrates the broadcast of the signal $s_t(t)$ by the $i^{th}$ BST (201) at Time '$\tau_{o,i}$' and its reception by the MR (202) at Time of Arrival: '$\tau_i$', for i=1, 2, 3.

When the BST is IS-95 based or GPS-based, the time $\tau_{o,i}$ is the time of transmission of a given pilot PN sequence while $\tau_i$ is the time of reception of such a PN sequence. When the BST is AMPs-based, the time $\tau_{o,i}$ is the time of transmission of a given DCC sequence while $\tau_i$ is the time of reception of such a sequence. In order to solve for the horizontal coordinates (x,y) of the MR (202), the minimum number of BSTs required depends on the positioning technology used.

Figure 3:
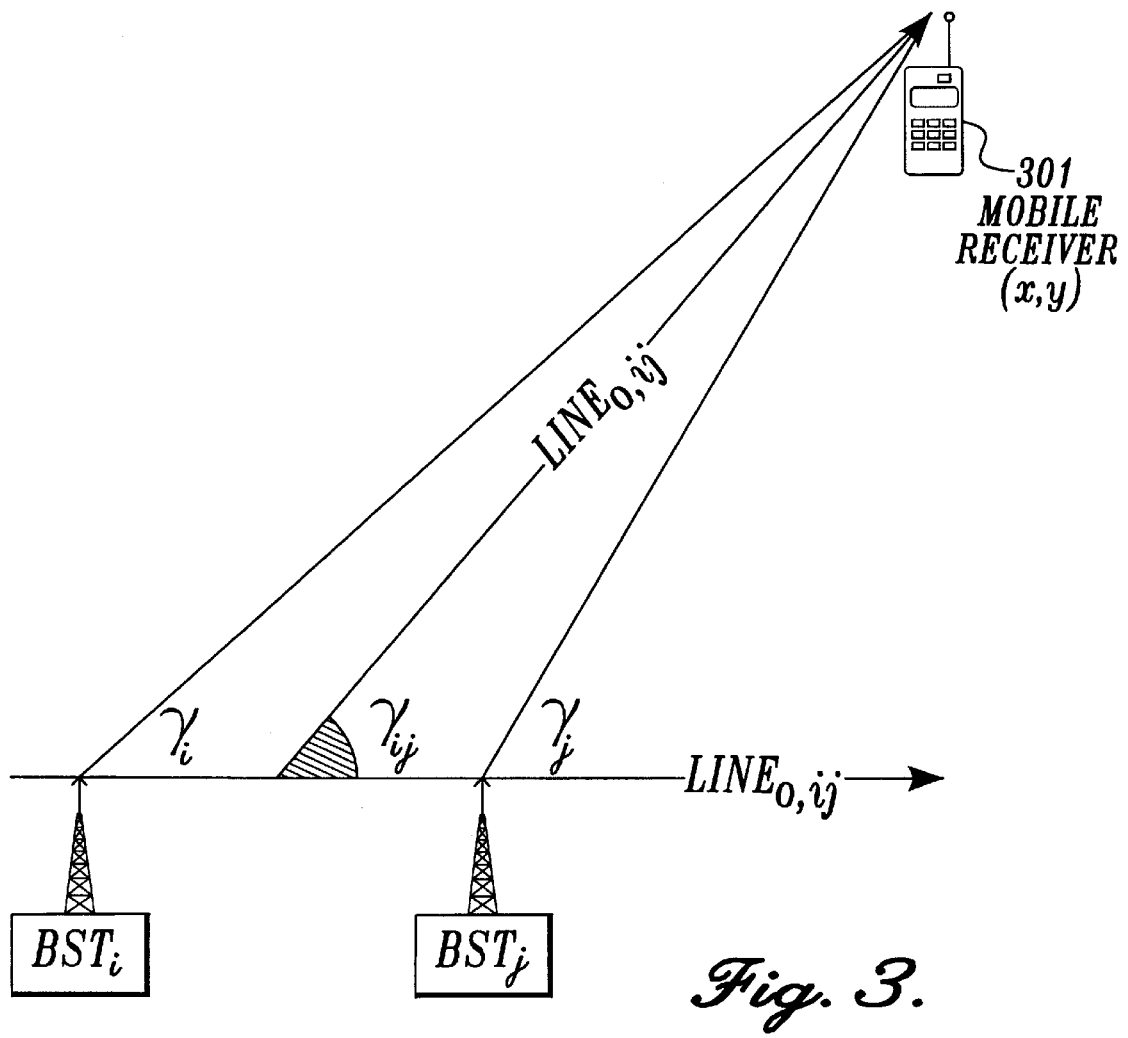

FIG. 3 illustrates Angle of Arrival for several wavefronts from BSTs at a MR, and assumes that the MR is far from $BST_i$ and $BST_j$ with respect to the baseline between the two BSTs. Such an assumption implies that the transmitted wavefronts are planar, i.e. $\gamma_i \approx \gamma_j \approx \gamma_{i,j}$, where:

$\gamma_i$ is the Angle Of Arrival (AOA), of signal $s_t(t)$ from the $i^{th}$ BST to the MR, $\gamma_j$ is the AOA of signal $s_t(t)$ from the $j^{th}$ BST to the MR, and $\gamma_{ij}$ is defined as the angle formed between:
1. the line joining the $i^{th}$ BST to the $j^{th}$ BST (which we refer to as line$_{i,j}$); and,
2. the line joining the MR (301) and the middle of line$_{i,j}$ between the two BSTs (which we refer to as line$_{o,i,j}$) in a clockwise manner from line$_{o,i,j}$ to line$_{i,j}$.

Figure 4:
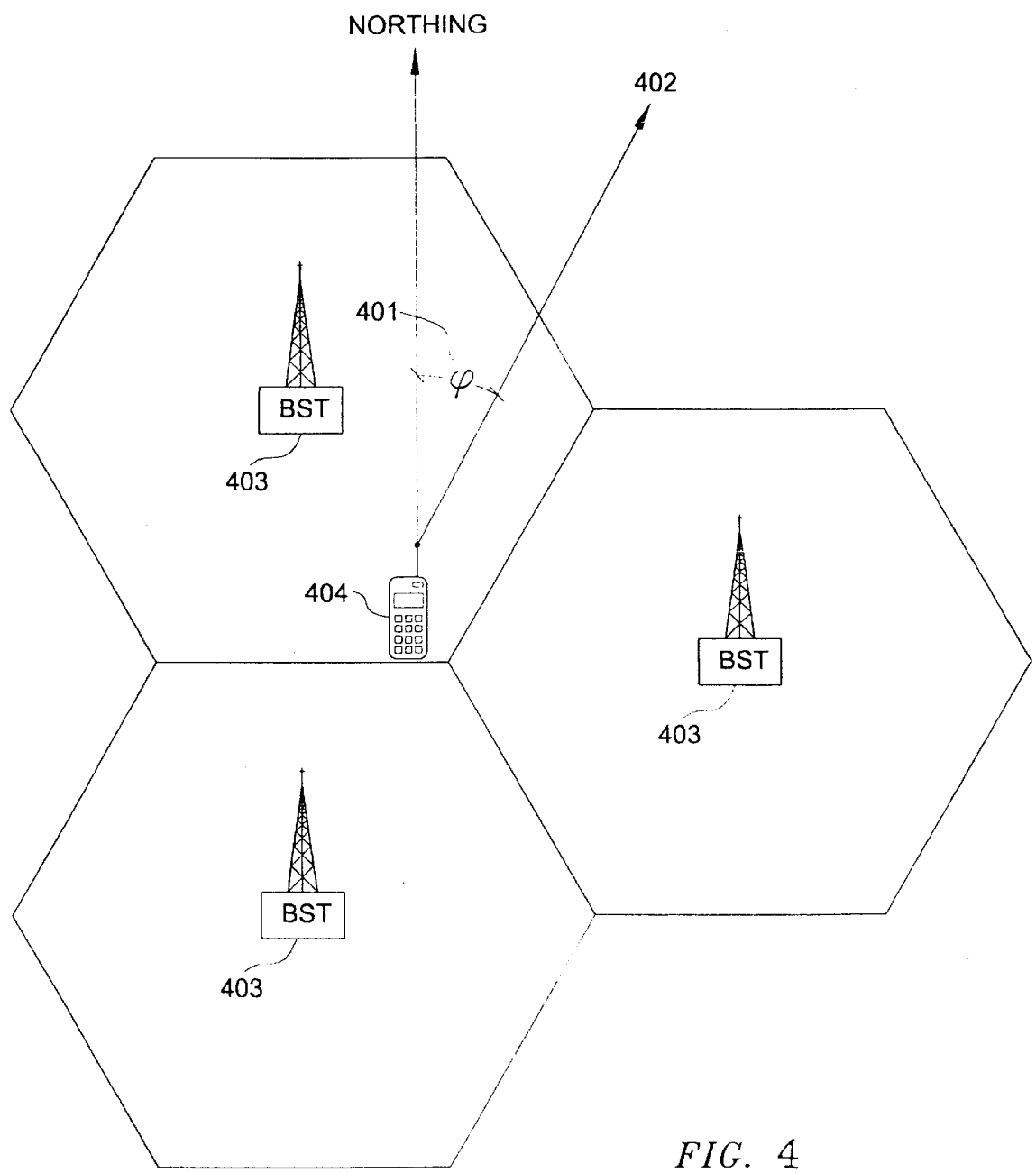

FIG. 4 illustrates the Direction of Travel (DOT) '$\phi$' (401) relative to Northing (in a clockwise manner from Northing) and the speed v (402) of the MR (404) relative to the BSTs (403). '$\phi$' and v represent the velocity $\vec{v}$ of the MR with respect to the BSTs (403). In a cellular system, the BSTs are stationary which is not th case in a satellite-based system.

Figure 5:
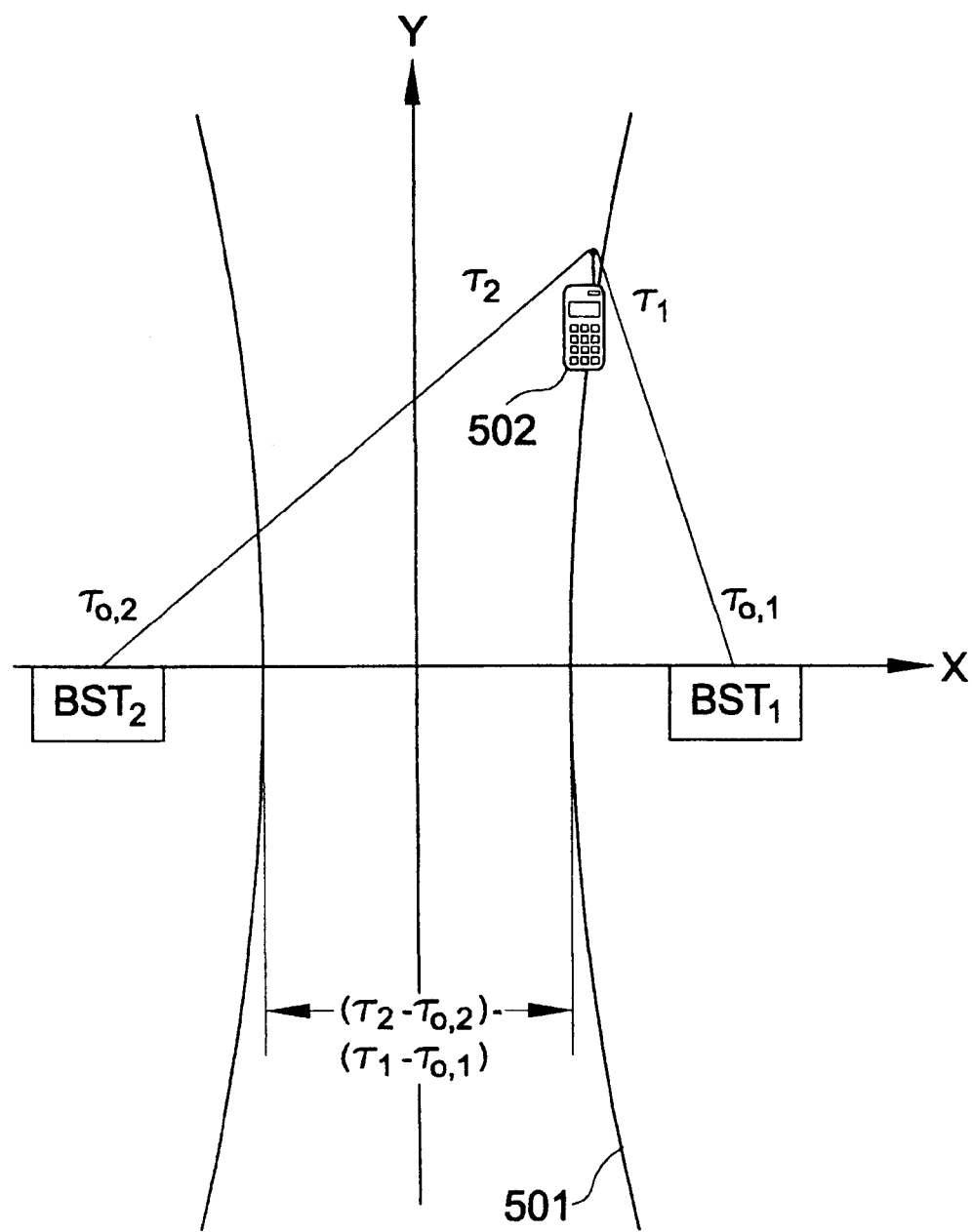

Without loss of generality,

FIG. 5 illustrates the two-dimensional (horizontal) Locus of Position (501) for $TDOA_{2,1}$ which is defined as $$TDOA_{2,1} = (\tau_2 - \tau_{o,2}) - (\tau_1 - \tau_{o,1}) \quad (1$$

$$= \frac{1}{c}\sqrt{(x_2 - x)^2 + (y_2 - y)^2} - \frac{1}{c}\sqrt{(x_1 - x)^2 + (y_1 - y)^2}$$

where c is the speed of propagation, $(x_1, y_1, z_1)$ are the coordinates of the antenna of $BST_1$, $(x_2, y_2, z_2)$ are the coordinates of the antenna at $BST_2$, and (x,y) are the coordinates of the MR (502). This is achieved using TDOA-based Hyperbolic Multilateration (as shown in Turin, G. L. et al., "A Statistical Model of Urban Multipath Propagation," *IEEE Transactions on Vehicular Technology*, Vol. VT-21, No. 1, February 1972, and as shown in Smith, J. O. et al., "Closed-form Least-Squares Source Location Estimation from Range-Difference Measurements," *IEEE Transactions on Acoustics, Speech, and Signal Processing*, Vol. ASSP-35, No. 12, December, 1987).

In the case where the three-dimensional coordinates of the MR are required, we have to solve for (x,y,z) using $$TDOA_{2,1} = (\tau_2 - \tau_{o,2}) - (\tau_1 - \tau_{o,1}) \quad (2)$$

$$= \frac{1}{c}\sqrt{(x_2 - x)^2 + (y_2 - y)^2 + (z_2 - z)^2} -$$

$$\frac{1}{c}\sqrt{(x_1 - x)^2 + (y_1 - y)^2 + (z_1 - z)^2}$$

Figure 6:
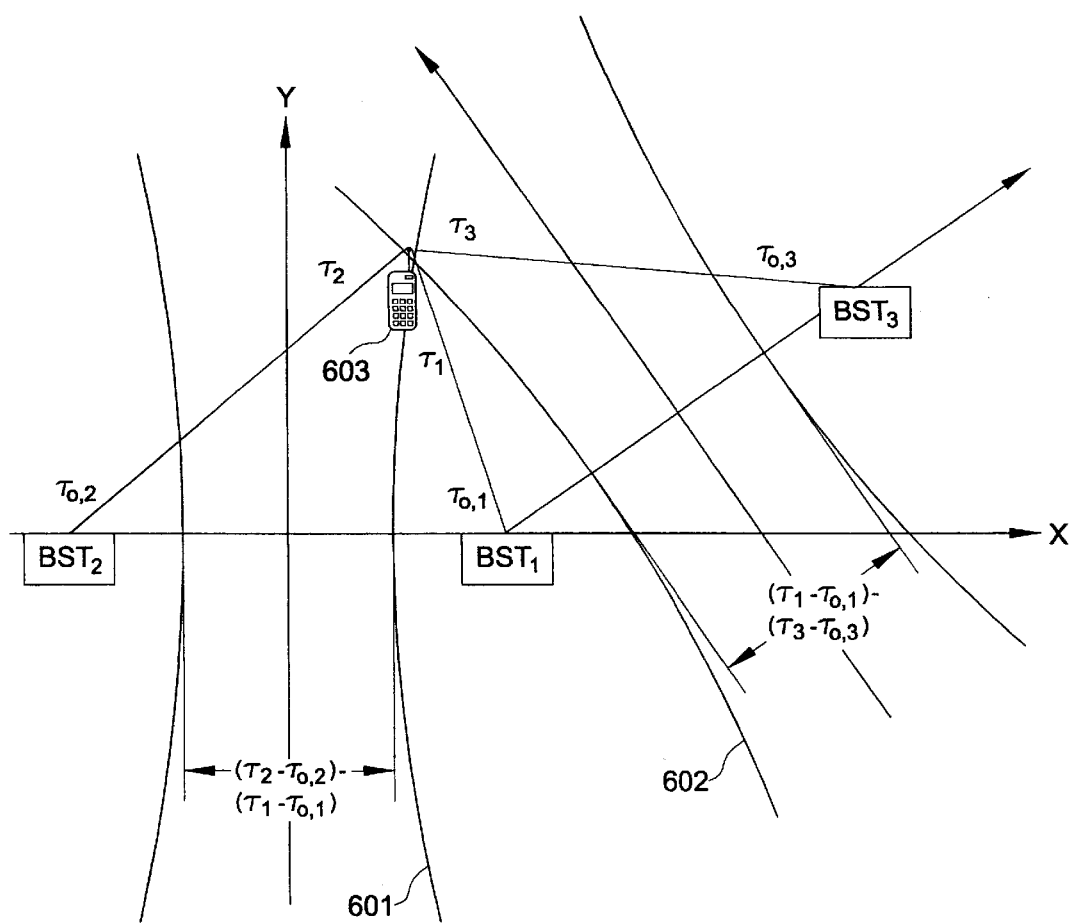

Without loss of generality,

FIG. 6 illustrates the two intersecting locii of Position for the two-dimensional coordinates (x,y) of the MR (603) based on $TDOA_{2,1}$ (601) and $TDOA_{3,1}$ (602). In other words, it is possible to solve for (x,y) as the intersection between the two trajectories obtained using three Times of Arrival (TOAs) (after choosing the correct side of each hyperbola). In order to solve for (x,y,z) we require four TOAs.

Figure 7A:
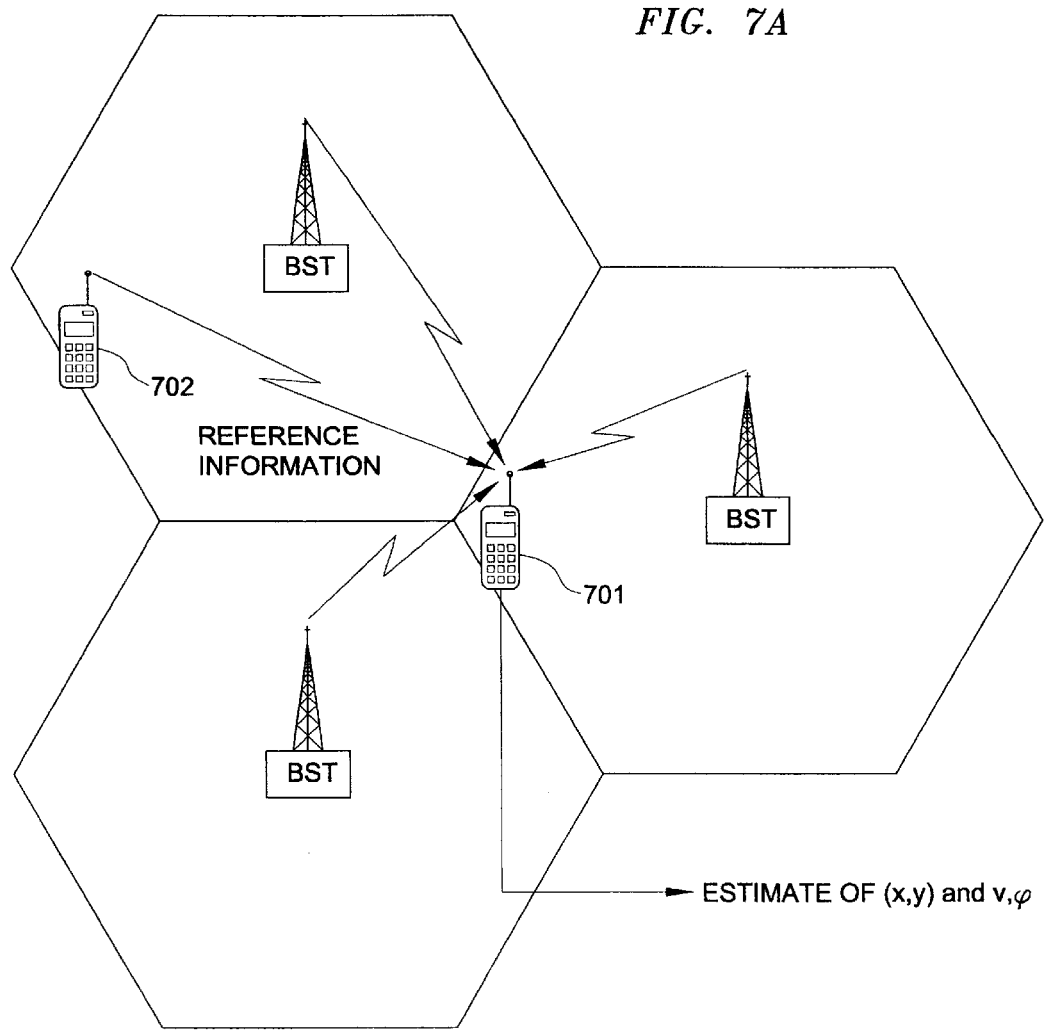

FIG. 7a illustrates the Second State of the WLS where the signal, $s_t(t)$, is received by the MR (701). The MR (701) processes the received signal, $r_t(t)$, to estimate its own coordinates (x,y), speed v and DOT $\phi$ with the assistance of a Reference Receiver (RR) (702) of known location. The function of the RR is to estimate the Reference Information regarding the BSTs and to transmit it to the MR (701). We will refer to such a system as Option I.

Figure 7B:
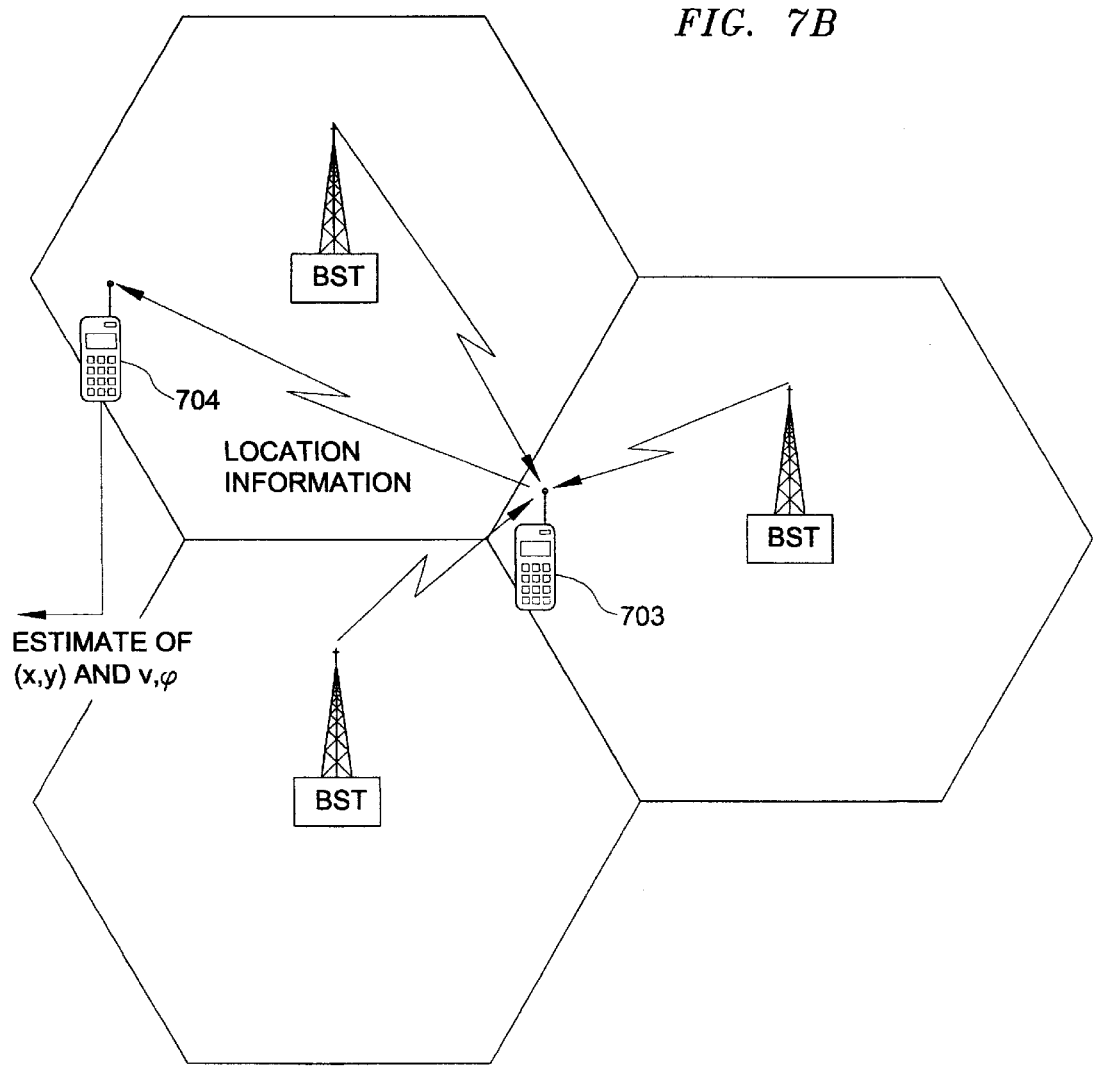

FIG. 7b illustrates al alternative of the Second Stage of the Wireless location system where the signal, $s_t(t)$, is received by the MR (703). The MR processes the received signal, $r_t(t)$, and transmits the Location information to the RR (704). In turn, the RR estimates the coordinates (x,y) of the MR, its speed v and DOT $\phi$, based on the Location Information transmitted by the MR (703) and based on the Reference Information estimated by the RR (704). We will refer to such a system as Option II.

Figure 7C:
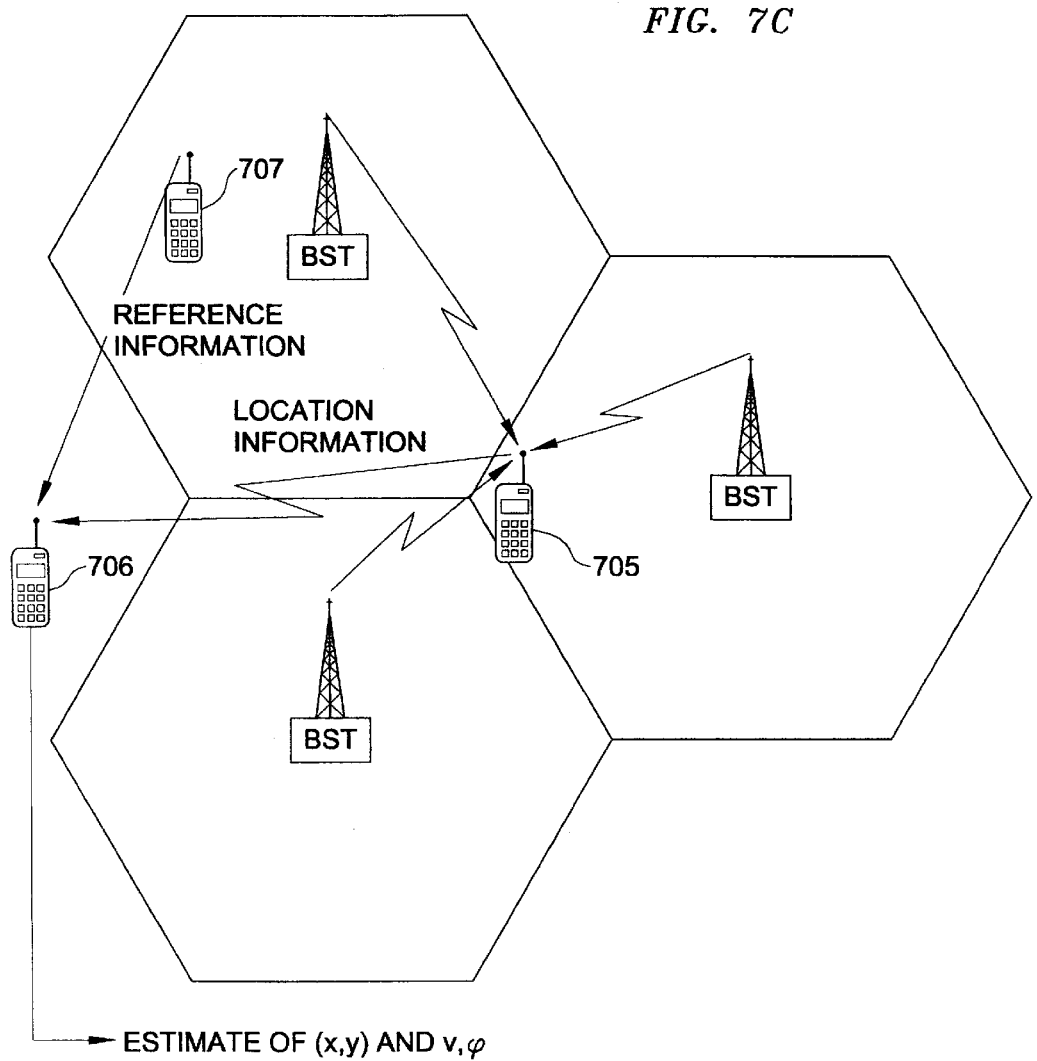

FIG. 7c illustrates yet another alternative of the Second Stage of the Wireless location system where the signal, $s_t(t)$, is received by the MR (705). The MR processes the received signal, $r_t(t)$, and transmits the Location Information to a Third Receiver (TR) (706). In turn, the RR (707) estimates the Reference Information regarding the BSTs and transmits it to the same Third Receiver (TR) (706). The TR estimates the coordinates (x,y) of the MR, its speed v and DOT $\phi$, based on the Location Information transmitted by the MR (705) and based on the Reference Information transmitted by the RR (707). We will refer to such a system as Option III.

Figure 8:
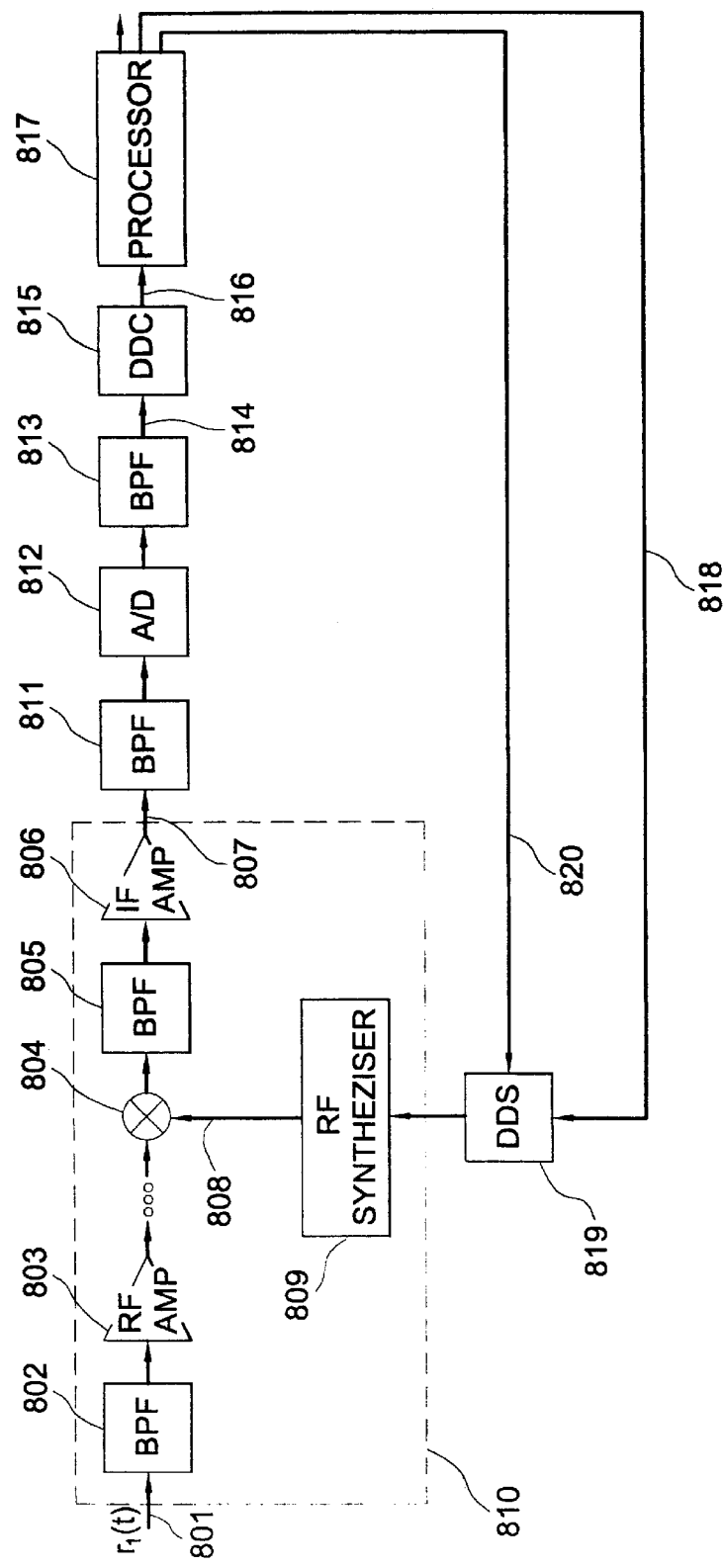
Figure 9A:
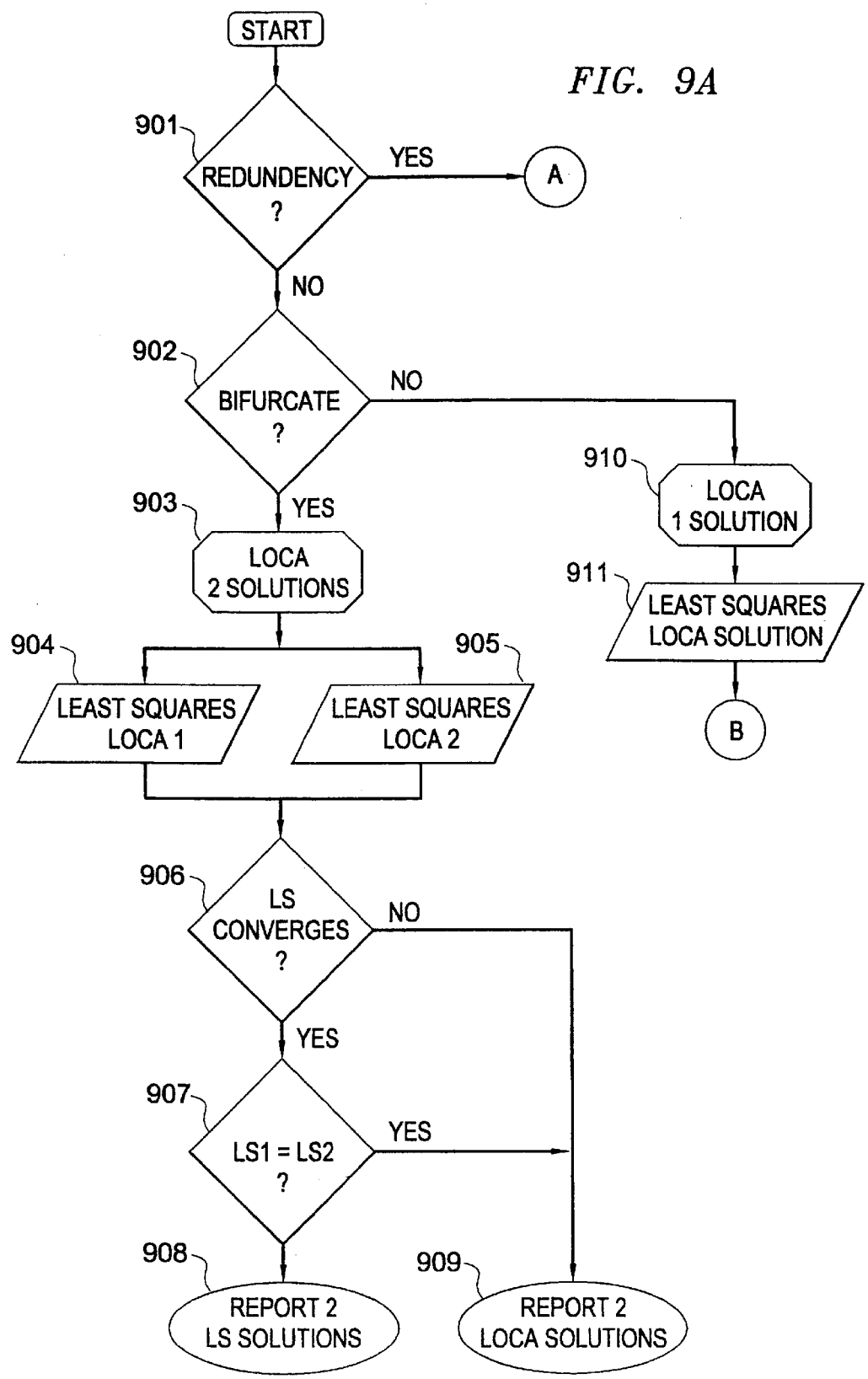
Figure 9B:
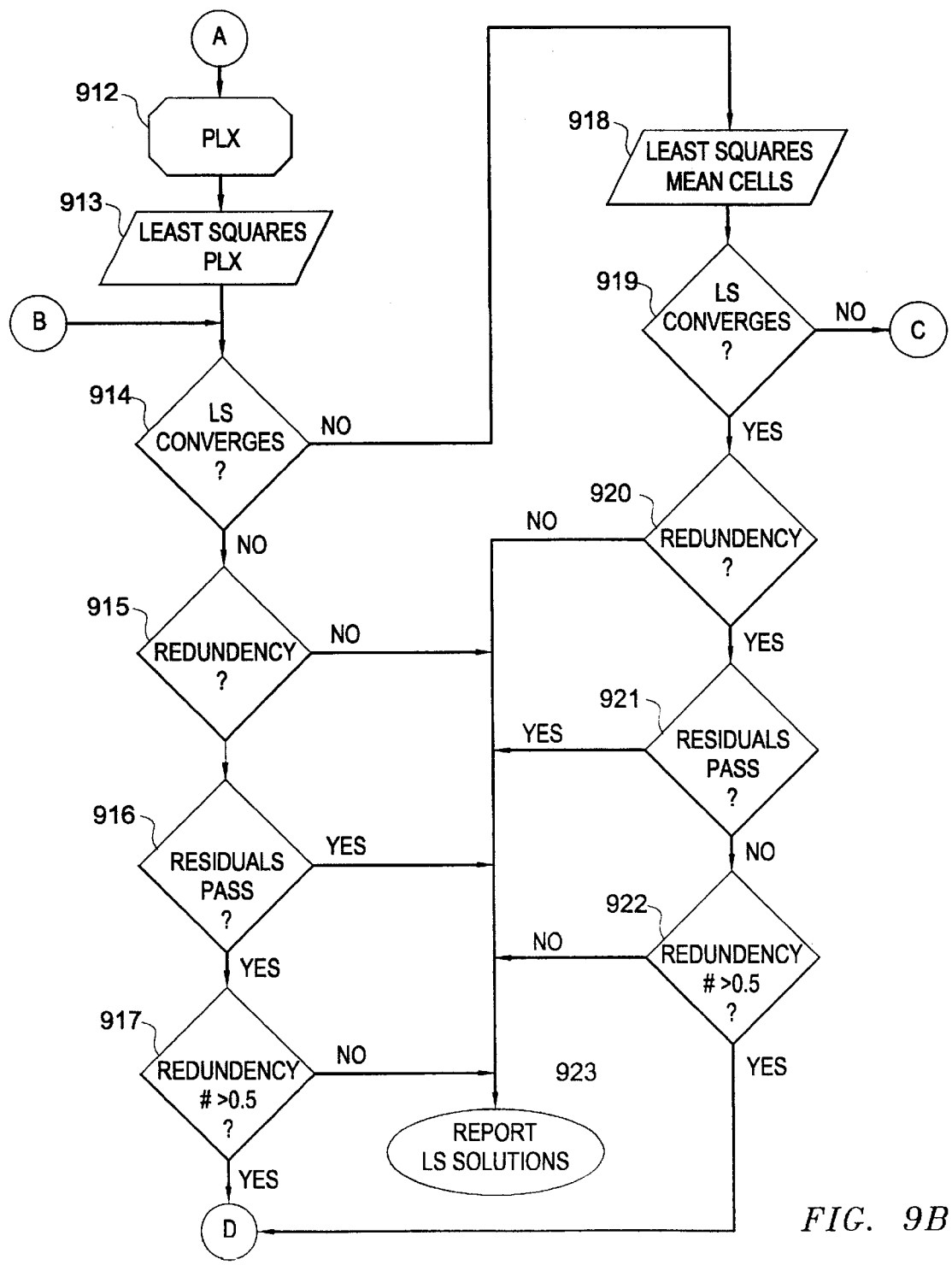
Figure 9C:
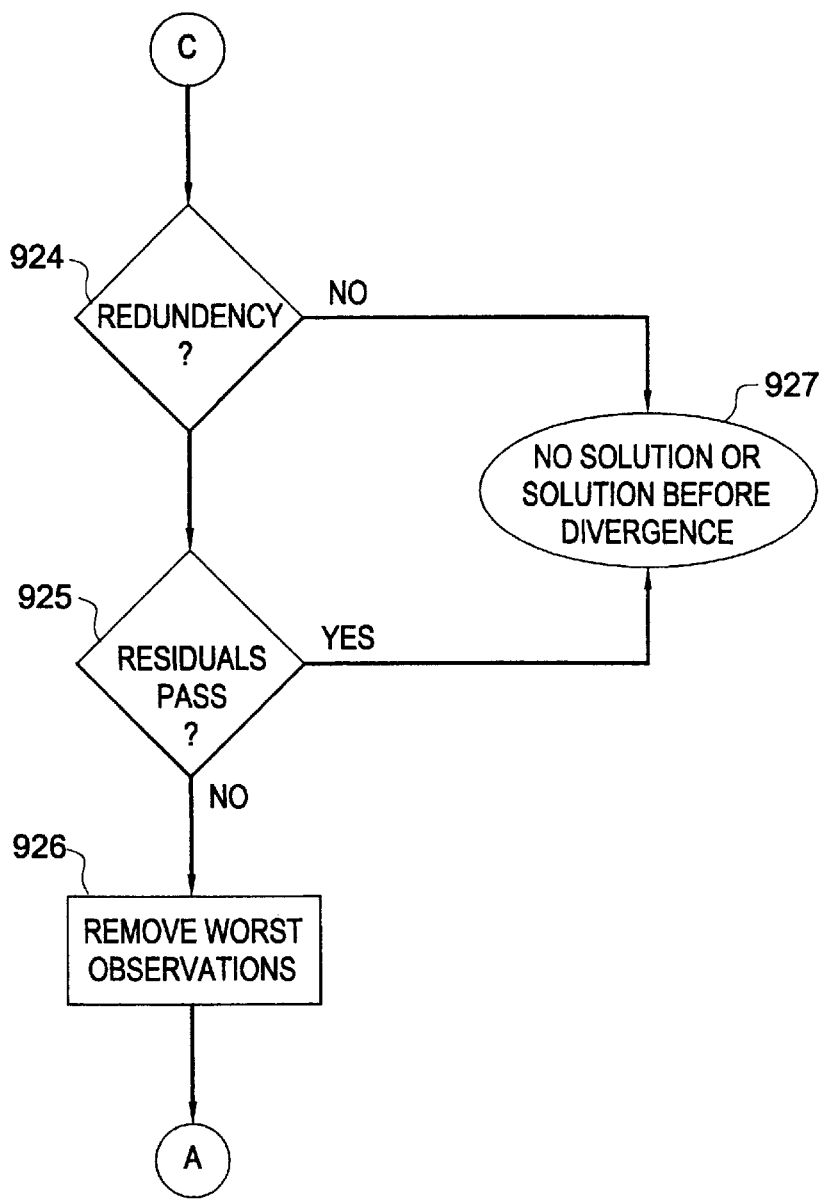
Figure 9D:
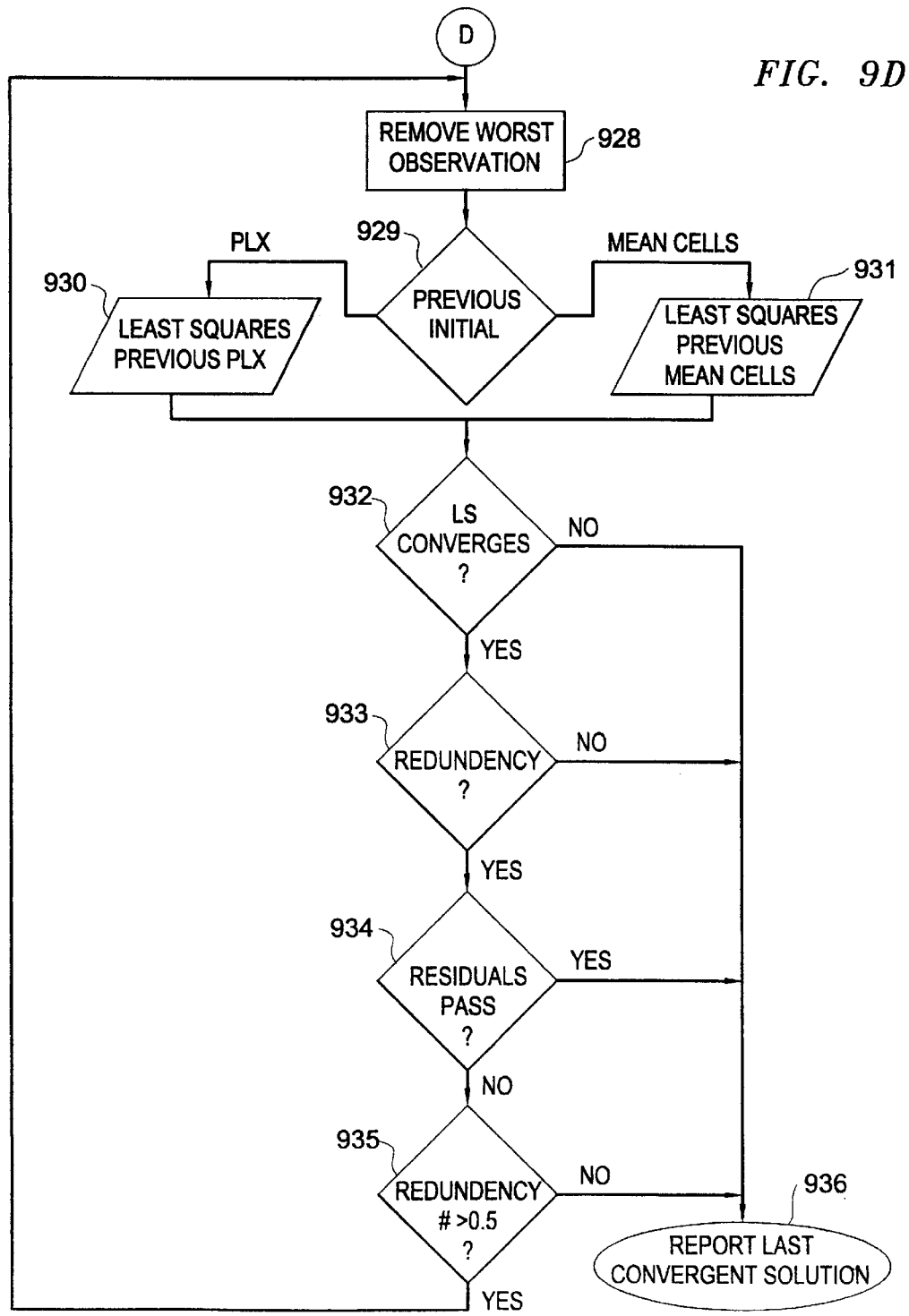

FIG. 8 illustrates the description of Design I for the MR. The received RF signal $r_t(t)$ transmitted from the $i^{th}$ BST is initially filtered by an RF Band Pass Filter (BPF) (802), amplified by an RF amplifier (803), down-converted by one or more Intermediate Frequency (IF) stages (810). Each IF stage consists of a mixture (804) with an LO (808) generated using an RF synthesizer (809), an IF BPF (805) and an IF amplifier (806). After the IF stages, the resulting analog IF signal (807) of IF frequency $f_1$ is filtered by a pre-aliasing filter (811), sampled by an A/D (812) and filtered again using digital filters (813) in order to generate a digital IF signal (814) of center frequency $f_2$, where $f_2 < f_1$. An optional Direct Digital Converter (DDC) (815) is used to down-convert the digital IF signal (814) to Baseband. The resulting signal is then processed by a Digital Signal Processor (DSP) (817) in order to estimate the Frequency Of Arrival (FOA) of the received signal, $r_t(t)$. A function of the estimated FOA is fed-back to a Direct Digital Synthesizer (DDS) (819) which controls the RF synthesizer (809). the DSP (817) also provides a reference signal (820) to the DDS (819). A preferred source for the reference signal (820) is one that is common to all BSTs such as a GPS signal.

FIGS. 9a, 9b, 9c and 9d illustrate a flow diagram for the positioning strategy. The positioning strategy consists of a number of algorithms (Least Squares, Location On the Conic Axis (LOCA), Plane Intersection) and numerous decisions. Given a set of observations, there are 4 possible outcomes: two LS position solutions (908), two LOCA position solutions (909), one LS position solution (923, 936), and no position solution (927).

Figure 10:
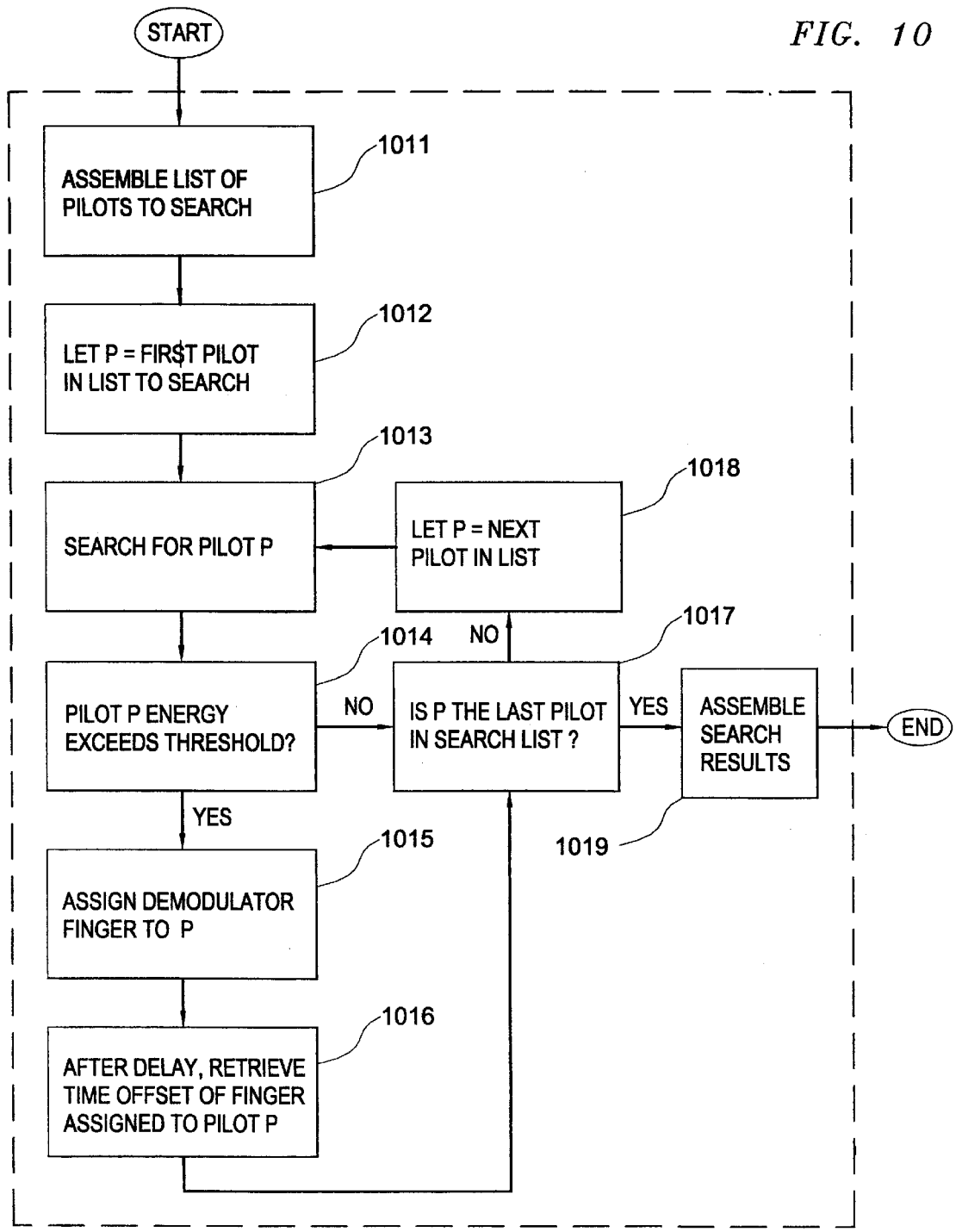

FIG. 10 presents the preferred embodiment of an algorithm by which a MR an obtain TOA estimates of multiple IS-95 pilot signals. A search is made for each pilot over multiple time lags. If a pilot is detected, then it is further observed to obtain a TOA estimate of refined accuracy.

Figure 11:
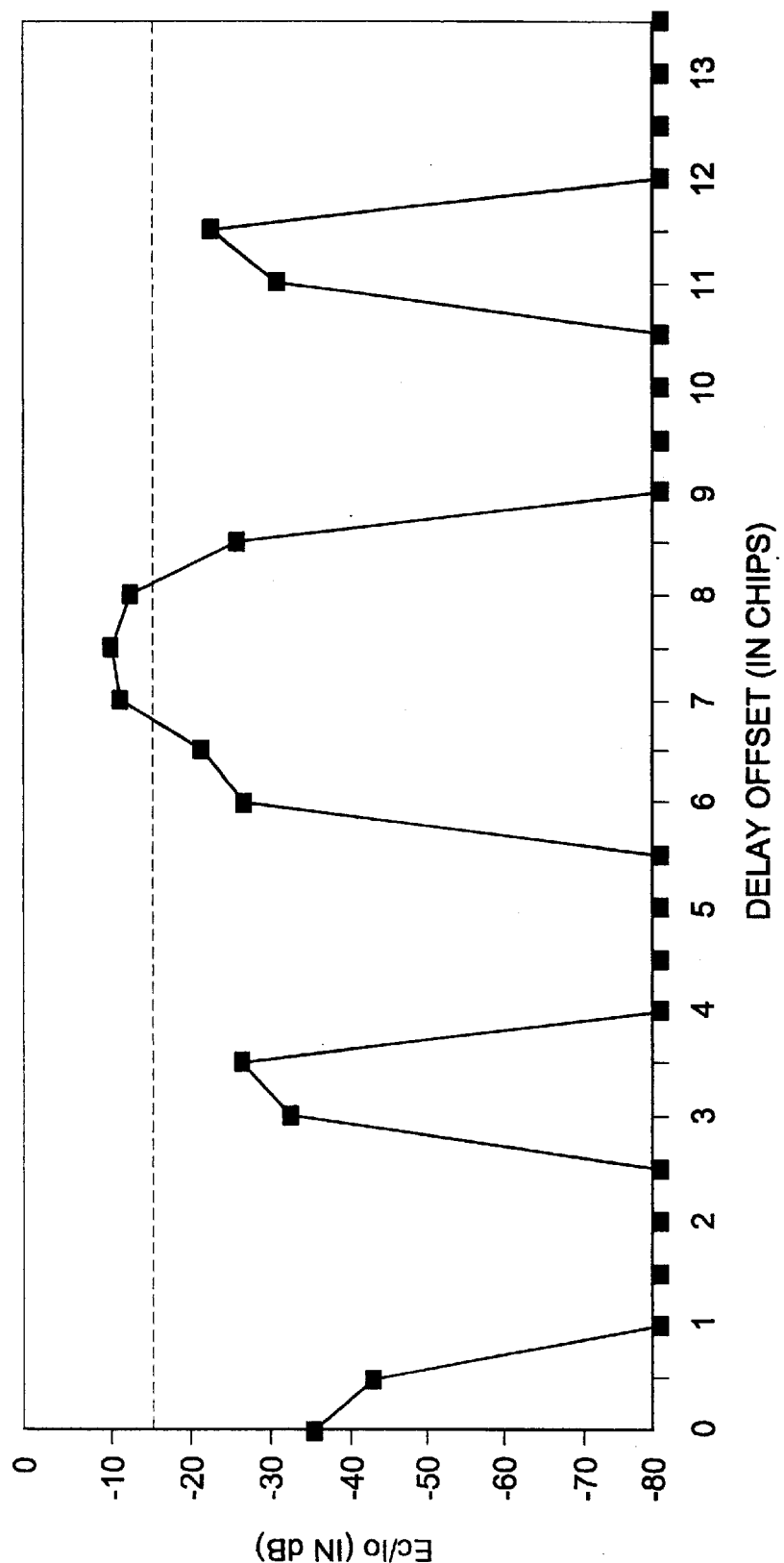

FIG. 11 shows correlation values which might be obtained when searching for a particular pilot over multiple time lags, or delay offsets. Ec/Io is the ratio of average pilot chip energy to the total received power. A higher value of Ec/Io indicates greater likelihood of arrival of the pilot signal at a particular delay offset. In this figure, the delay offsets are expressed in IS-95 chips (approximately 0.814 $\mu$s). In this figure, the horizontal dotted line indicates a threshold (−15 dB in this case) for detection of the pilot arrival. An Ec/Io value greater than this threshold is considered to indicate an arrival of the pilot signal at the MR, at that particular time lag.

Figure 12:
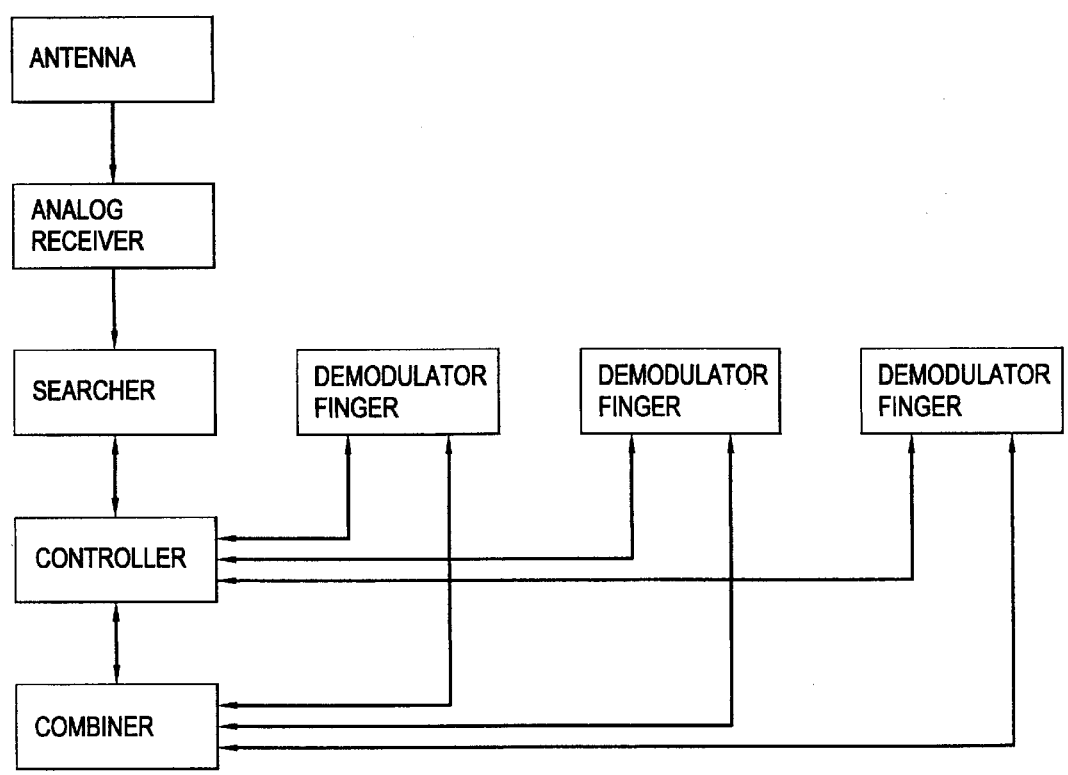

FIG. 12 indicates a possible architecture for the embodiment of the MR as a CDMA CT, which may be used to implement the algorithm of FIG. 10. Under the direction of a Controller, a Searcher searches for pilot signals at different time lags of the received signal of the MR. The Demodulator Fingers are assigned to different pilot signals. When assigned to a pilot, a Demodulator Finger will slew its timing to track the pilot, and may demodulate data transmitted synchronously with that pilot. This architecture is presented in U.S. Pat. No. 5,764,687 Mobile Demodulator Architecture for a Spread Spectrum Multiple Access Communications System.

DEFINITIONS

The following definitions take precedence over definitions for the same terms that can be found in the open literature.

Mobile Receiver (MR): is a device, which can be portable or fixed, that can consist of a receiver alone or both a receiver and a transmitter. It can be a regular Cellular Telephone (CT), a PCS (Personal Communication Systems) telephone, a cordless telephone, a Personal Digital Assistant (PDA), a GPS receiver, or a combination thereof. It can be a radio tag or a wireless telephone that does not contain the audio portion of the telephone. It can also be a transmitter that transmits periodically over a given channel, or a receiver that receives Radio signals, or both.

Reference Receiver (RR): is a device of known location with respect to the location of BSTs that are transmitting radio signals intended for reception by both the MR and the RR. An RR can be portable or fixed. It can consist of a receive alone or both a receiver and a transmitter. The RR estimates the TOA, POA, SOA and/or FOA of signals transmitted by the BSTs. It either transmits the Reference Information to the MR or to the TR, or it receives the Location Information from the MR. In some unique situations when the BSTs are referenced to a common signal, the RR is not required.

Reference Information: is the estimated TOA, POA, SOA and/or FOA of the signals transmitted by a number of BSTs at the RR as well as the location of such BSTs.

Location Information: is the estimated TOA, POA, SOA and/or FOA of the signals transmitted by a number of BSTs at the MR.

Third Receiver (TR): is a device that receives Location Information from the MR as well as Reference Information from the RR in order to estimate the location of the MR. It can be a receiver only, or a transmitter and a receiver. The Mobile Switching Center (MSC) can play the role of the TR.

Base Station Transmitter (BST): is a device of known location with respect to other BSTs at a given time. A BST can be portable or fixed. It can consist of a transmitter alone or both a receiver and a transmitter. It can be a regular cellular Base Station (BS), a regular satellite transceiver, a GPS satellite, a Loran-C transmitter, a dedicated transmitter, a transponder, or any other type of transmitter/transceiver combination.

Host: is a processor that processes the Location Information together with the Reference Information to estimate the location of the MR. The function of the Host can be played by the MR, the RR or a TR. The host can also be responsible for location services such as fleet management, location sensitive billing, etc.

Network-based WLS (Forward/Downlink-based WLS): locates a Mobile Receiver (MR) using a plurality of BSTs that transmit signals received by both the MR and the RR.

Handset-based WLS (Reverse/uplink-based WLS): locates a Mobile Transmitter (MT) using a plurality of receivers that receive the signal transmitted form the MT.

Cell: is a geographical area serviced by a cellular Base Station (BS).

Sectorized cell: is a cell that is made of several non-overlapping sectors. Each sector can be considered as an independent cell to be serviced by an independent cellular BS. However, sectors in a cell are usually serviced by the same cellular BS in order to minimize cost and complexity. We refer to such a BS as a sectorized BS.

Pilot Channel: is the channel to be used by each sector to broadcast a (locally unique) pilot signal.

Pilot Signal: is defined as a sequence known to the MR. As defined in the IS-95 standard, this sequence is a code repeated exactly 75 times every 2 seconds, and is known as the "pilot PN sequence" or the "short code". although all sectors broadcast the same pilot signal, the transmissions from each baser station have different synchronization or phases, which distinguish the pilot signals. Phase increments are specified as multiples of 64 chips, where 1 chip is $\frac{1}{1.2288}$ microseconds. The offset in units of 64 chips, is referred to as the pilot PN offset. Pilot increments in a network are typically 3 or 4 PN offsets. A PN offset of 4 corresponds to 256 chips, or 208.3 microseconds.

As defined in the AMPs standard or in the IS-136/GSM standard, this sequence is a Digital Colour Code (DCC) that is repeated as specific intervals of time.

Super-Resolution (SR) Algorithm: is an operation that transforms a time domain signal, s(t), to a frequency domain signal, S(f), in such a way that the frequency domain signal, S(f), has a better resolution than the resolution offered by the Fourier transform, i.e. S(f) has a better resolution than the Fourier transform f{s(t)}, of s(t). Vice-versa, a SR algorithm transforms a frequency domain signal, S(f), to a time domain signal, s(t), with a better resolution than th resolution offered by the inverse Fourier transform, i.e. s(t) has a better resolution than the inverse Fourier transform $f^{-1}\{S(f)\}$, of S(f)). Examples of SR algorithms are well known in the literature and include:

MUSIC/Root MUSIC,

ESPRIT,

Auto Regressive Moving Average,

Minimum Variance,

MUSIC using Higher Order Statistics,

ESPRIT using Higher Order Statistics,

Auto Regressive Moving Average using Higher Order Statistics, or

Minimum Variance using Higher Order Statistics.

Frequency-domain Rayleigh Resolution: is the frequency-domain resolution offered by the Fourier transform.

Time-domain Rayleigh Resolution: is the time-domain resolution offered by the inverse Fourier transform, Inverse SR algorithm: is an algorithm which processes a time domain signal in order to improve its time-domain resolution over the conventional time-domain Rayleigh resolution. A preferred embodiment of the inverse SR algorithm comprises a conventional time domain correlator, a time domain window, a Fourier Transform, a frequency domain window, a frequency domain equalizer, and a processor which performs a SR algorithm in order to resolve the TOAs in the received signal at a given MR.

Alternatively, an inverse SR algorithm can process a frequency domain signal in order to improve its frequency-domain resolution over the conventional frequency-domain Rayleigh resolution. In this case, a preferred embodiment of the inverse SR algorithm comprises a frequency domain correlator, a frequency domain window, an inverse Fourier Transform a time domain window, a time domain equalizer, and a processor which performs a SR algorithm in order to resolve the FOAs in the received signal at a given MR.

Sector Antennas: are cellular antennas that exist in some BS that service more than one sector. Each sector has a dedicated antenna (or set of antennas if diversity is applied).

Fourier Transform-Based Filters: are filters that:

1. Fourier Transform the time domain signal, then
2. window the transformed signal over a given band, and
3. Inverse Fourier Transform the windowed signal.

Description of an IS-95 CT receiving Pilot signals:

The CT measures the quality of received pilot signals by computing the ratio between the received energy of a pilot ($E_c$) to the total received power by the mobile ($I_o$). This measurement is referred to as the $E_c/I_o$ of the pilot. This measurement is closely related to the signal strength of the pilot. An IS-95 CT uses the $E_c/I_o$ measurement of a pilot to estimate the suitability of the communications link between itself (the CT) and that particular sector in a BS. For example, if a CT is in a mode in which it may only communicate with one sector at a time, it may choose to communicate with the sector which has the highest $E_c/I_o$ measured by the CT.

An IS-95 CT may include a searcher element and multiple demodulator fingers as shown in FIG. 12. A searcher is used to search for pilot signals by measuring the $E_c/I_o$ of a pilot signal at different delays. A demodulator finger tracks a pilot signal, and may demodulate an information signal associated with said pilot signal.

In addition to transmitting a pilot signal, a base station may also transmit one or more information signals associated with the pilot. These information-bearing signals are transmitted at the same radio frequency as their associated pilot signal and are synchronized with the pilot signal. Thus, an information signal will under go propagation effects (attenuation, phase shift, time delays, multipath, frequency shift) nearly identical to those of its associated pilot signal. A mobile then tracks the propagation effects of a pilot to aid in demodulating information from an associated signal, or code channel. As well, the mobile can estimate the reliability of information demodulated from a code channel from the $E_c/I_o$ quality measurement of the associated pilot signal.

In general, a CT searches for pilot signals using one or more searchers, and then based on the searcher results, assigns demodulator fingers to demodulate information from code channels associated with suitable pilots. This process if ongoing so that the finger assignment adapts to the changing conditions typical of a CT cellular environment.

During normal operation, the searchers and demodulator fingers in an IS-95 CT are usually assigned according to algorithms which optimize the communications performance of the phone, and the network as a whole. These assignment algorithms will limit the performance of estimation of the CT location, as they will often ignore pilot signals useful for the location estimation. We prefer to force the CT to enter into a state optimized for location.

OBJECTS AND SUMMARY OF THE INVENTION

According to an aspect of the invention, there is provided a handset-based Wireless Location System (WLS) whereby an MR can be located using signals received by both the MR and an RR. More specifically, it is an object of the invention to estimate the static and kinematic positional information of a MR which receives signals transmitted from a number of BSTs.

According to a further aspect of the invention, there is provided a system that corrects for the sources of error that affect the different location technologies for a handset-based WLS in a unique and novel way.

According to a further aspect of the invention, there is provided a system that solves for the position of the MR suing Least Squares where misclosures and standardized residuals are used to flag the observations that might have a blunder.

According to a further aspect of the invention, there is provided a system that uses Chaffee's method or Location On the Conic Axis (LOCA) to detect solution bifurcation.

According to a further aspect of the invention, there is provided a system that uses LOCA and/or Plane Intersection to provide an initial position for Least Squares.

According to a further aspect of the invention, there is provided a system that uses individually, or in combination, TDOA observations, hybrid TDOA observations and AOA observations to locate the MR.

According to a further aspect of the invention, there is provided a system that resolves the AOA ambiguity at a cellular BS by using the TDOA information from two distant BSs or the AOA from several sectors at the same cellular BS.

According to a further aspect of the invention, there is provided a system that uses the range information from two BSTs or the AOA from several sectors at the same cellular base station to resolve the AOA ambiguity at such a BST.

DETAILED DESCRIPTION OF PREFERRED EMBODIMENTS OF THE INVENTION

Theory:

In a WLS, many factors affect the system performance:
1. RF shadowing and flat fading,
2. frequency offsets (including LOs drift and Doppler Shifts),
3. clock errors,
4. time delays,
5. noise,
6. multipath (selective fading),
7. interference;
8. geographical geometry of the BSTs relative to the intended MR.

Each factor degrades the estimate location of the MR depending on the technology employed for extracting the independent equations required for location.

RF Transmission: More specifically, the Low Pass (LP) equivalent signal, $\tilde{s}_i(t)$, transmitted from the $i^{th}$ BST can be modeled as $$\tilde{s}_i(t) = e^{-j2\pi(f_c + \Delta f_i)\tau_{o,i}} e^{j(2\pi\Delta f_i t + \zeta_i)} p_i(:t-\tau_{o,i}) \qquad (3)$$

and the RF transmitted signal, $s_i(t)$, (see FIG. 1) can be expressed as $$s_i(t) = Re\{e^{j2\pi f_c t} \tilde{s}_i(t)\} \qquad (4)$$

where

Re{.} denotes a real part operation;

$f_c$ is the carrier frequency, $\Delta f_i$ is the frequency offset from $f_c$ (usually unknown to the MR since it depends on the BST; it is to be estimated by the RR), $\tau_{o,i}$=Time Of Transmission of signal $p_i(t)$ (also unknown to the MR), $\zeta_i$ is the phase of the frequency $f_c + \Delta f_i$ (also unknown to the MR), $j=\sqrt{-1}$, and $p_i(t)$ is a band-limited baseband signal transmitted by the $i^{th}$ BST.

RF Reception: Then, the LP equivalent signal, $\tilde{r}_i(t)$, received by the MR and corresponding to $\tilde{s}_i(t)$ can be modeled as $$\tilde{r}_i(t) = G_i R_i^{-n} e^{j(\theta_i + \zeta_i)} e^{j2\pi(\delta f_i + \Delta f_i)t} p_i(t-\tau_i \tau_{o,i} - \Delta t_i) + w_i(t) + MP_i(t) + \tilde{I}_i(t) \qquad (5)$$

and the RF received signal, $r_i(t)$, (see FIG. 2) can be expressed as $$r_i(t) = Re\{e^{j2\pi f_c t} \tilde{r}_i(t)\} \qquad (6)$$

where

Re {.} denotes a real part operation;

$G_i$ represents the gain (real due to the transmitting and receiving antennas: from the $i^{th}$ BST to the MR antenna (i.e. a function of the two antenna patterns), $R_i^{-n}$ represents the attenuation (real) due to the propagation channel, where n is a real number (usually between 2 and 4) that depends on the channel and $R_i$ is the range between the $i^{th}$ BST and the MR, $$\theta_i = \{-2\pi(f_c + \delta f_i + \Delta f_i)(\tau_i - \tau_{o,i} + \Delta t_i)\} \bmod 2\pi \qquad (7)$$

is the phase of the received RF signal at the MR, where:

$\delta f_i$ is the frequency offset due to the Doppler shift over the propagation channel (a function of speed, v, with respect to the BSTs and Direction Of Travel (DOT), $\phi$, with respect to Northing).

$\tau_i$=TOA of a signal $p_i(t-\tau_{o,i})$ (a function of the range $R_i$), $\Delta t_i$ is the overall group delay through the $i^{th}$ BST to the MR antenna (usually a function of frequency), $w_i(t)$ represents the Additive White Gaussian Noise (AWGN, complex) due to thermal noise at the MR (a function of temperature and bandwidth), $MP_i(t)$ represents all multipath components (complex) at MR antenna (a function of the environment and of theelevation of the antennas), and $\tilde{I}_i(t)$ represents low-pass equivalent interference (both in-band and out-of-band) at the MR.

Total RF Reception: In IS-95, a number of pilot signals, sync signals, paging signals, and forward traffic signals, are transmitted over the same frequency band in the forward link. In GPS, a number of signals are transmitted from the satellites over the same frequency band. In other words, in a CDMA system $\tilde{I}_i(t)$ represents all CDMA signals excluding $\tilde{r}_i(t)$.

Baseband Reception: Several IF stages down-convert the received RF signal, $r_i(t)$, to an analog baseband signal, $\hat{r}_i(t)$, which is equivalent to performing the following operation:

$$\hat{r}_i(t) = Re\{e^{j2\pi f_c t} \tilde{r}_i(t) e^{-j2\pi(f_c + \Delta f_o)t} e^{-j\zeta_o}\} = Re\{\tilde{r}_i(t) e^{-j2\pi\Delta f_o t} e^{-j\zeta_o}\} \qquad (8)$$

where $\Delta f_o$ is the frequency error between the Local Oscillators (LOs) in the MR receiver and the carrier frequency $f_c$; and $\zeta_o$ is the carrier phase in the Local Oscillators (LOs) of the MR.

From equations (5), (6) and (8), one can refer to:

"$\psi_i = \theta_i - \zeta_o + \zeta_i$" as the Phase Of Arrival (POA) of the received signal, $\hat{r}_i(t)$, from the $i^{th}$ BST at the MR; and "$f_i = \delta f_i - \Delta f_o + \Delta f_i$" as the Frequency Of Arrival (FOA) of the received signal, $\hat{r}_i(t)$, from the $i^{th}$ BST at the MR.

Digital Reception: Finally, an Analog-to-Digital (A-to-D) Converter converts the baseband signal, $\hat{r}(t)$, to a digital signal, $\hat{r}(m)$, which is equivalent to performing the following operation:

$$\hat{r}(m) = \hat{r}(t)|_{t=m\Delta T} + q(m) \qquad (9)$$

where
- ΔT is the sampling interval in the MR:
- m is an integer; and
- q(m) is the quantization noise which depends on the number of bits in the A-to-D.

Sources of Location Information in equation (5):

There are several sources of information where one can extract an independent equation from equation (5) regarding the static location of the MR, i.e. regarding the coordinates, (x,y), of the MR:

1. $R_i^{-n}$,
2. $\psi_i$, and
3. $p_t(t-\tau_i+\tau_{o,i}-\Delta t_i)$.

In addition, there is one source of information where one can extract an independent equation from equation (5) regarding the knematic location of the MR, i.e. regarding the velocity, $\bar{v}$, namely:

4. $f_i$.

Starting with the static informatin, we have:

1. $R_1^{-n}$: In the static case, the first source, $R_i^{-n}$, can be used to estimate $R_i$. However, $R_i^{-n}$ is unreliable due to the nature of the radio channel where RF shadowing and flat fading can deviate the value of "n" in "$R_i^{-n}$" from 2 (for Line Of Sight (LOS)) to 4 (for an urban environment, as shown in Hata, M., "Empirical Formula for Radio Propagation Loss in Land Mobile Radio Services," *IEEE Transactions on Vehicular Technology*, Vol. VT-29, No. 3, August 1980), or even 6 in heavy urban environments. Hence, unless LOS is guaranteed between the MR and the $i^{th}$ BST, $R_i^{-n}$ can only offer an accuracy of a few kilometers for $R_i$. In the case when LOS is guaranteed (e.g. in a flat environment such as on the sea or over a lake), $G_i$ has to be known to the $i^{th}$ BST and "n" can be chosen to be 2.

2. $\psi_i$: The second source, the POA $$\psi_i=\{-2\pi(f_c+\delta f_i+\Delta f_i)(\tau_i-\tau_{o,i}+\Delta t_i)+\delta\zeta_i\} \bmod 2\pi \quad (10)$$

can be used to estimate the TOA, $\tau_i$, where $\Delta\zeta_i=\zeta_i-\zeta_o$. The POA, $\psi_i$, is related to the range, $R_i$, between the $i^{th}$ BST, and the MR through equations (10) and (11):

$$R_i=(\tau_i-\tau_{o,i})c \quad (11)$$

where c is the speed of propagation.

Since the time of transmission, $\tau_{o,i}$, in (11) is unknown to the MR, one can either:

1. estimate it, then use the estimated value in TOA positioning, or
2. remove it using TDOA positioning.

Both TOA and TDOA positioning ar explained later in the patent.

In TOA positioning, a possible method to estimate $\tau_o$ is to estimate the Round Trip Delay (RTD) between:
- the transmission from the MR to an active BST and
- the reception by the MR of the response of the active BST.

In this case, $$2R_i=(2\tau_i-\tau_{MR})c \quad (12)$$

where $\tau_{MR}$ is the time of transmission from the MR to the BST and $2\tau_i$ is the TOA of the response of the BST to the MR. A drawback in estimating the RTD from equation (12) is that equation (12) assumes that the BST is able to transmit a response bvack to the MR. This assumption makes the handset-based WLS depend on the functionality of the BSTs. This implies that the handsest-based WLS is network dependent. Nonetheless, we will carry on using such a concept in order to be able to aid a handset-based solution with a network-based solution.

Furthermore, in TOA positioning, a drawback in using $\theta_i$ in equation (10) to estimate $\tau_i$ is the existence of a "modulo $2\pi$" operation in (10) which implies that there can be a large integer ambiguity in the TOS estimation.

In TDOA positioning, a pair of TOAs, $\tau_i$ and $\tau_j$, is needed per independent equation. In this case, the amount of ambiguity is a function of the baseline between the two transmitting antennas, i.e. between the $i^{th}$ BST and the $j^{th}$ BST with respect to the wavelength corresponding to the frequency: $f_c+\delta f_i+\Delta f_i$ in (10), as shown in equation (13):

$$\tau_i-\tau_j=(\tau_{o,i}-\tau_{o,j})-\{(\psi_i-\psi_j)-(\Delta\zeta_i-\Delta\zeta_j)+2\pi n\}/2\pi f_c-(\Delta t_i-\Delta t_j)+\text{extra term} \quad (13)$$

where
- $\tau_i$ corresponds to the TOS of $r_i(t)$ at the MR;
- $\tau_j$ corresponds to the TOA of $r_j(t)$ at the MR;
- $\tau_{o,i}$ corresponds to the TOT of $p_t(t-\tau_{o,i})$;
- $\tau_{oj}$ corresponds to the TOT of $p_t(t-\tau_{oj})$;
- n is the integer ambiguity; and
- the extra term in (13) is due to the existence of
  - $\Delta f_i$ in (10) which depends on the eror in the LOs for the $i^{th}$ BS relative to $f_c$; and to
  - $\delta f_i$ in (10) which depends on the felocity $\bar{v}$ of the MR and the wavelength $\lambda$ corresponding to $f_c$.

The term $(\tau_{o,i}-\tau_{oj})$ is known to the MR and can be included in equation (13).

In the IS-95 and J-STD-008 standards, the CT frequency, $f_c+\Delta f_o$, can deviate by up to 0.05 part per million (i.e. by up to 95 Hz for a 1900 MHz carrier frequency). Furthermore, in cellular telephony in North America, the carrier frequency, $f_c$, can take values around 800 MHz (with a wavelength $\lambda$ of around 37.5 cm) or values around 1.9 GHz (with a wavelength $\lambda$ of around 15.8 cm). This implies that for a velocity of 100 km/hr $\delta f_i$ corresponds to:

$-75 \text{ Hz} > \delta f_i > 75 \text{ Hz}$ for $f_c = 800$ Mhz, or to $-150 \text{ Hz} > \delta f_i > 150 \text{ Hz}$ for $f_c = 1.9$ Ghz.

In conclusion:

1. $f_c \ll \delta f_i$ and $f_c \ll \Delta f_o$, i.e. the extra term in (13) is negligible; and
2. the amount of ambiguity in (13) can be potentially large unless the baseline between the two receiving antennas is samll with respect to the wavelength, $\lambda$, corresponding to the frequency: $f_c$. We refer to such a solution as Solution I.

Solution I: When the baseline, $d_{ij}$, between the antenna at the $i^{th}$ BST and the antenna at the $j^{th}$ BST is of the same order of magnitude as the wavelength, $\lambda$, it is possible to generate a solution using either TDOA or PDOA. The TDOA solution between the two antennas is a hyperbola while the PDOA solution between the two antennas is a line. Both solutions approximate the exact solution and coincide asymptotically, i.e. the PDOA line and the TDOA hyperbola coincide at infinity.

Remark: From a practical point of view, the baseline, $d_{ij}$, can be of the same order of magnitude as $\lambda$ only if the two antennas belong to different sectors of the same cellular base station.

We assume that the MR is far from both antennas with respect to $d_{ij}$. Such an assumption implies that:

1. the transmitted wavefront is planar, i.e. $\gamma_i \cong \gamma_j \cong \gamma_{ij}$, where:
   $\gamma_i$ is the Angle Of Arrival (AOA) of $r_i(t)$ from the antenna of the $i^{th}$ BST to the MR,
   $\gamma_j$ is the AOA of $r_j(t)$ from the antenna of the $j^{th}$ BST to the MR, and
   $\gamma_{ij}$ is defined as the angle fromed between:
   the line joining the antenna of the $i^{th}$ BST to the antenna of the $j^{th}$ BST (which we refer to as $line_{i,j}$); and,
   the line joining the MR to the middle of $line_{i,j}$ between the two antennas (which we refer to as $line_{o,i,j}$)
   in a clockwise manner from $line_{o,i,j}$ to $line_{i,j}$.

2. the following equation relates the Phase Difference of Arrival (PDOA), $(\psi_i - \psi_j)$, to the angle $\gamma_{ij}$:

$$\frac{2\pi d_{i,j}}{\lambda} \cos(\gamma_{i,j}) = (\psi_i - \psi_j) \bmod 2\pi \quad (14)$$

where:

$\psi_i$ is the Phase Of Arrival (POA) of $r_i(t)$ at the MR; and
$\psi_j$ is the POA of $r_j(t)$ at the MR.
The solution for $\gamma_{ij}$ in (14) is $$\gamma_{i,j} = \pm \cos^{-1}\left\{\frac{\lambda}{2\pi d_{i,j}}(\psi_i - \psi_j + 2\pi k)\right\} \quad (15)$$

where k in (15) is an integer that has to satisfy the following condition:

$$-1 \le \frac{\lambda}{d_{i,j}}\left\{\frac{(\psi_i - \psi_j) \bmod 2\pi}{2\pi} + k\right\} \le 1 \quad (16)$$

For example, when $d_{ij} = \lambda$, we have the following possible solutions for k:

$$\text{when } \frac{(\psi_i - \psi_j) \bmod 2\pi}{2\pi} = -1, \quad \text{we have } k = 0, 1 \text{ or } 2; \quad (17)$$

$$\text{when } \frac{(\psi_i - \psi_j) \bmod 2\pi}{2\pi} = +1, \quad \text{we have } k = 0, -1 \text{ or } -2;$$

$$\text{when } \frac{(\psi_i - \psi_j) \bmod 2\pi}{2\pi} = -1/2, \quad \text{we have } k = 0, \text{ or } 1;$$

$$\text{when } \frac{(\psi_i - \psi_j) \bmod 2\pi}{2\pi} = +1/2, \quad \text{we have } k = 0, \text{ or } -1;$$

$$\text{when } \frac{(\psi_i - \psi_j) \bmod 2\pi}{2\pi} = 0, \quad \text{we have } k = 0, 1 \text{ or } -1;$$

Some of the solutions in (17) are trivial. As $d_{ij}$ becomes larger than $\lambda$, we have more nontrivial solution. Even though having more than one solution implies ambiguity, it is possible to resolve the ambiguity using Least-Squares Techniques as explained later.

In processing $\psi_i$ to estimate either $\tau_i$ or $\gamma_i$, we have the following sources of errors;

The effect of noise, $w_i(t)$, on $\gamma_i$:
When using a linear array of antennas to estimate the AOA of an RF signal approximated as a planar wavefront (i.e. assuming a distant RF source), the Cramer-Rao Lower Bound on the variance, $\text{var}(\hat{\gamma}_i)$, of the estimated AOA $\hat{\gamma}_i$, is equal to $$(\text{var}(\hat{\gamma}_i)|)_{Tone} \ge \frac{12c^2}{SNR_i|_{Tone} \times 4\pi^2 \times M \times (M^2 - 1) \times d^2 \times \sin^2\gamma_i \times f_m^2} \quad (18)$$

where
$\text{var}(\hat{\gamma}_i)|_{Tone}$ is the variance of the estimate $\hat{\gamma}_i$ of the bearing $\gamma_i$,
$SNR_{i|Tone} = A_i^2/(2\sigma_n^2)$,
$A_i$ is the amplitude of the tone,
$\sigma_n^2$ is the noise variance,
M is the number of elements in the antenna array,
d is the distance between antenna elements,
$f_m$ is the frequency of the tone, and
c is the speed of light, Equation (18) is based on the transmission of a narrowband tone from each element of the array at the same phase. When the transmitted signal $s_i(t)$ is either a wideband signal (e.g. CDMA) or $s_i(t)$ has a unique frequency $F_m$ (e.g. FDMA), (18) no longer applies directly, but can be made to apply after some mathematical adjustmenats to the received signals using the Reference Information estimated by the RR.

The effect of noise, $w_i(t)$ on $\psi_i$: The Cramer-Rao Lower Bound provides a lower bound on the variance, $\text{var}(\hat{\psi}_i)|_{Tone}$, of the estimate, $\hat{\psi}_i$, of the phase $\psi_i$ for a tone of frequency $f_m$ due to AWGN:

$$\left((\text{var}(\hat{R}_i)|)_{Tone} = \left(\frac{\lambda}{2\pi}\right)^2 \text{var}(\hat{\psi}_i)|\right)_{Tone} \ge \frac{c^2}{SNR_i|_{Tone} \times N_i \times 4\pi^2 f_m^2} \quad (19)$$

where
$\text{var}(\hat{R}_i)|_{Tone}$ is the variance of the estimate, $\hat{R}_i$, of the range $R_i$,
$\lambda$ is the wavelength of the tone,
$f_m$ is the frequency of the tone corresponding to $\lambda$ (e.e. $f_m = c/\lambda$),
$SNR_{i|Tone} = A_i^2/(2\sigma_n^2)$ where $SNR_i$ is the Signal-to-Noise Ratio at the MR from the $i^{th}$ BST,
$A_i$ is the amplitude of the tone at the MR from the $i^{th}$ BST,
$\sigma_n^2$ is the noise variance,
$N_i$ is the number of samples (which is directly related to the observation interval $T_i$ through $T_i = N_i/f_s$ where $f_s$ is the ampling frequency),
c is the speed of propagation.

Once again equation (19) is based on the transmission of a narrowband tone from each element of the array at the same phase. When the transmitted signal $s_i(t)$ is either a wideband signal (e.g. CDMA) or $s_i(t)$ has a unique frequency $f_m$ (e.g. FDMA), (19) no longer applies directly, but can be made to apply after some mathematical adjustmenats to the received signals using the Reference Information estimated by the RR.

Phase offsets: The phase of the tone $f_m$ is shifted by $\Delta\zeta_i$. When $\Delta\zeta_i$ is a function of the frequency $f_m$, it has to be estimated otherwise the phase $\psi_i$ is distorted.

time delays, $\Delta t_i$: The propagation delay $\tau_i$ is affected by $\Delta t_i$ which represents the system delay through the antenna, cables, filters, amplifiers, etc. Once again if $\Delta t_i$ is a function of the frequency $f_m$, it has to be estimated otherwise the propagation delay can vary significantly from one received signal to another.

multipath, $MP_i(t)$: In TDOA, the multipath $MP_i(t)$ is equivalent to extra delay over the propagation channel and has to be either estimated and removed, or mitigated. In the case where the phase estimate is used to solve for the AOA of the received signal $r_i(t)$, the effect of multipath is to shift the AOA of $r_i(t)$ by some amoount depending on the AOA of $MP_i(t)$ and it magnitude.

interference, $\tilde{I}_i(t)$: Depending on the level of interference, $\tilde{I}_i(t)$ can have a drastic effect on the accuracy of the estimated phase and may saturate the RF front end of the receiver. Its effects can be mitigated with both analog and idgital hardware, as well as adequate software, whether it is in-band or out-of-band.

The practical description describes methods and apparatus to estimate $\theta_i$ and to mitigate its sources of errors.

3. $p_i(t-\tau_i+\tau_{o,i}-\Delta t_i)$: The last (and most common) source of information one can use to extract an independent equation for the static location of the MR is $$p_i(t-\tau_i+\tau_{o,i}-\Delta t_i) \qquad (20)$$

which can be used to estimate either $\tau_i$ or $\gamma_i$:

When $\tau_i$ is estimated directly we refer to the solution as Solution II. In this case, either TOA positioning or TDOA positioning can be used.

When $\gamma_i$ is estimated from $\tau_i$, we refer to the solution as Solution III. In this case, AOA positioning is used.

When $\tau_i$ is estimated indirectly based on the phases of tones in $p_i(t-\tau_i+\tau_{o,i}-\Delta t_i)$, we refer to the solution as Solution IV. Once again, either TOA positioning or TDOA positioning can be used as discussed above.

Solution II: The most common method for estimating $\tau_i$ is to cross-correlate $p_i(t-\tau_i+\tau_{o,i}-\Delta t_i)$ with $p_i(t)$, i.e. to cross-correlate $r(t)$ with $p_i(t)$. In general several peaks result from such a correlation particularly when receiving pilot signals in CDMA where all transmitted pilots are identical except for a relative delay between pilots. In this case, the peak corresponding to $\tau_i$ in $p_i(t-\tau_i+\tau_{o,i}\Delta t_i)$ is located within a reasonable propagation delay, $\tau_i-\tau_{o,i}$, with respect to a clock derived from the signal, and can be distinguished from other pilots.

In TOA positioning, the time of transmission, $\tau_{o,i}$, from the antenna of the $i^{th}$ BST to the MR has to be estimated in order to estimate $\tau_i-\tau_{o,i}$. A possible method is to estimate the RTD between the MR transmission and the reception at the MR of the BST response to the MR transmission as shown in equation (12).

In TDOA positioning, the time of transmission, $\tau_{o,i}$, is estmated using an extra independent equation. This is accomplished by estimating $\tau_j$. Once again, the most common method for estimating $\tau_j$ is to cross-correlate $p_j(t-\tau_j+\tau_{oj}-\Delta t_j)$ with $p_j(t)$, i.e. to cross-correlate $r_j(t)$ with $p_j(t)$. In CDMA, the resulting correlation peak corresponding to $r_j$ in $p_j(t-\tau_j+\tau_{oj}-\Delta t_j)$ is located withing a reasonable propagation delay, $\tau_j-\tau_{o,j}$, with respect to a clock derived from the signal. The TDOA, $\tau_i-\tau_j$, can be used to estimate the relative delay, $(\tau_j-\tau_{o,i})-(\tau_i-\tau_{o,j})$ since the relative TOT, $\tau_{o,i}-\tau_{o,j}$, between the $i^{th}$ pilot and the $j_{th}$ pilot is known at the MR.

Solution III: In order to estimate $\gamma_{ij}$ from the TDOA solution, $\tau_i-\tau_j$, we assume that the MR is far from both the antenna at the $i^{th}$ BST and the antenna at the $j^{th}$ BST with respect to their baseline, $d_{ij}$. As mentioned previously, such an assumption practically implies that:

1. Both antennas exist at the same BST.
2. The received wavefront is planar, i.e. $\gamma_i \approx \gamma_j \approx \gamma_{i,j}$, where $\gamma_i$ is the Angle Of Arrival (AOA) of $r_i(t)$ from the antenna of the $i^{th}$ BST to the MR,
$\gamma_j$ is the AOA of $r_j(t)$ from the antenna of the $j^{th}$ BST to the MR, and
$\gamma_{i,j}$ is defined as the angle formed between:
the line joining the antenna of the $i^{th}$ BST to the antenna of the $j^{th}$ BST (which we refer to as $\text{line}_{i,j}$); and,
the line joining the MR to the middle of $\text{line}_{i,j}$ between the two antennas (which we refer to as $\text{line}_{o,i,j}$)
in a clockwise manner from $\text{line}_{o,i,j}$ to $\text{line}_{i,j}$.

3. Equation (21) relates the angle $\gamma_{i,j}$ to the Time Difference of Arrival (TDOA), $\tau_i-\tau_j$, as follows $$\frac{d_{i,j}}{c}\cos(\gamma_{i,j}) = \tau_i - \tau_j \qquad (21)$$

where $d_{i,j}$ is the distance between the antenna at the $i^{th}$ BST and the antenna at the $j^{th}$ BST; and c is the speed of propagation.

The advantage in estimating the AOA, $\gamma_{i,j}$, using $p_i(t-\tau_i+\tau_{o,i}-\Delta t_i)$ in equation (20) from equation (22):

$$\gamma_{i,j} = \pm\cos^{-1}\left\{\frac{c}{d_{i,j}}(\tau_i - \tau_j)\right\} \qquad (22)$$

instead of using $\psi_i$ in (10) from equation (23):

$$\gamma_{i,j} = \pm\cos^{-1}\left\{\frac{\lambda}{2\pi d_{i,j}}(\psi_i - \psi_j + 2\pi k)\right\} \qquad (23)$$

is the fact that there are no ambiguities in equation (22) except for the $\pm$ in the solution of $\gamma_i$, while equation (23) can have a number of ambiguities depending on the value of the integer k.

The disadvantages in estimating the AOA, $\gamma_{i,j}$, using $p_i(t-\tau_i+\tau_{o,i}-\Delta t_i)$ in equation (20) instead of using $\psi_i$ in (10) are:

1. a small baseline is required between the two antennas; and
2. the noise affects the variance, $\text{var}(\hat{\tau}_i)|_{p_i(t)}$, of $\hat{\tau}_i$ substantially more than it affects the variance, $\text{var}(\hat{\psi}_i)$, of $\hat{\psi}_i$.

The second disadvantage can be explained by comparing the Cramer-Rao Lower Bound for $\psi_i$:

$$\left(\left(\frac{\lambda}{2\pi}\right)^2 \text{var}(\hat{\psi}_i)\right)\bigg|_{Tone} \geq \frac{c^2}{(SNR_i|)_{Tone} \times N_i \times 4\pi^2 f_m^2} \qquad (24)$$

with the CRLB for $\hat{\tau}_i$:

$$(c^2 \text{var}(\hat{\tau}_i)|)_{p_i(t)} \geq \frac{c^2}{(SNR_i|)_{p_i(t)} \times 4\pi^2 BW^2} \qquad (25)$$

Assuming that $SNR_{i|Tone} \times N_i$ in (24) is equal to $SNR_{i|p_i(t)}$ in (25), then the difference betwen (24) and (25) is $f_m^2$ in (24) compared to $BW^2$ in (25). In AMPs the BW is approximatedly equal to 30 KHz while $f_m$ can be equal to the carrier frequency $f_c$ which is equal to 800 MHz. The ratio between the two values in dB is 44.26. In IS-95 and J-STD-008 the BW is approximatedly equal to 1.23 MHz while $f_m$ can be equal to the carrier frequency $f_c$, i.e. 800 MHz, The ratio between the two values in dB is 28.13 dB. In both cases the difference is large. Nonetheless, $p_i(t-\tau_i-\Delta t_i)$ in (20) is suitable for TDOA positioning while $\psi_i$ in (10) is suitable for AOA positioning as explained here:

Using $\psi_i$ in (10) to estimate the AOA, $\gamma_{i,j}$, we have a lower-bound of $5\times10^{-5}$ radians$^2$ for a SNR, $SNR_{i|tone} \times N_i$, of 30 dB and for a distance, d, of one wavelength, i.e. 0.375 m. This is equivalent ot having a standard deviation for $\hat{\gamma}_{i,j}$ of $7.07\times10^{-3}$ radians, which corresponds to a range error of 7.11 meters for every kilometer range between the MR and the antennas.

On the other hand, $p_i(t-\tau_i+\tau_{o,i}-\Delta t_i)$ in (20) is suitable for TDOA positioning since in this case the baseline between antennas does not have to be small. For example, assuming the SNR, $SNR_{i|p_i(t)}$, in equation (25) to be 30 dB for AMPs, the lower-bound on the variance, $\text{var}(\hat{R}_i)|_{p_i(t)} = c^2 \text{var}(\hat{\tau}_i)|_{p_i(t)}$, of the range $R_i$ is 2553 meters$^2$ or equivalently $\hat{R}_i$ has a standard deviation of 50.53 meters. On the other hand, assuming the SNR, $SNR_{i|p_i(t)}$, in equation (25) to be 10 dB for Is-95, the range $R_i$ is 150.69 meters$^2$ or equivalently $\hat{R}_i$ has a standard deviation of 12.28 meters.

Solution IV: When $\tau_i$ is estimated indirectly based on the phases of tones in $p_i(t-\tau_i+\tau_{o,i}-\Delta t_i)$, an integer ambiguity can still exist in the solution unless the wavelength of the selected tones is large with respect to the range between the MR and the antenna at the $i^{th}$ BST. The selected tones are discussed below where a solution for the integer ambiguity is presented.

In processing $p_i(t-\tau_i+\tau_{o,i}-\Delta t_i)$ to estimate $\tau_i$, we have the following sources of errors:

noise, $w_i(t)$: The Cramer-Rao Lower Bound provides a lower bound on the effect of AWGN on the variance, $\text{var}(\hat{\tau}_i)|_{p_i(t)}$, of the estimate of the delay $\tau_i$:

$$\text{var}(\hat{R}_i)|_{p_i(t)} = c^2 \text{var}(\hat{\tau}_i)|_{p_i(t)} \geq \frac{c^2}{(SNR_i)_{p_i(t)} \times 4\pi^2 BW^2} \quad (26)$$

where $\text{var}(\hat{R}_i)|_{p_i(t)}$ is the variance of the estimate, $\hat{R}_i$, of the range $R_i$,
BW is the RMS bandwidth of $p_i(t)$,
$SNR_{i|p_i(t)} = 2E_i/N_o$,
$E_i$ is the energy of $r_i(t)$,
$N_o$ is the noise Power Spectral Density, and
c is the speed of light.

The effect of Bandwidth, BW:

Equation (26) demonstrates that the bandwidth of the signal plays an important role in the accuracy of the wireless location system. In IS-95, the radio frequency (RF) channels have a bandwidth of approximately 1.25 MHz which is comparable to that of systems designed primarily for location such as Global Positioning Systems (GPS) with a BW of 1 MHz over Standard Positioning Services (SPS) channels and ISM-based location systems with a typical bandwidth of 10 MHz. In GPS, the location system may initially use a conventional sliding correlator to obtain a set of pseudo-ranges (one pseudo-range per satellite)(see e.g. Spilker, J. J., "GPS Signal Structure and Performance Characteristics," *Global Positioning System, Volume I*, The Institute of Navigation, Washington D.C., 1980). The pseudo-ranges are then used in multi-lateration to obtain a position fix of the GPS receiver. A typical accuracy for a commercial one point (i.e. no differential reception) GPS receiver with SPS is around 30 m RMS without Selective Availability (SA). In direct proportions, an IS-95 land-based location system which initially uses a conventional sliding correlator to obtain a TOA estimate of the transmitted radio signal followed by a hyperbolic (differential) multi-lateration of all the TOA estimates should offer a location accuracy better than 30 m RMS assuming no multipath. The reason is that the corelation function from which a TOA may be estimated has a resolution which is limited to that of the Fourier transform. The traditional resolution bound on Fourier-based methods is the Rayleigh resolution criterion as shown in Haykin, S., "*Adaptive Filter Theory,*" 2nd Edition, Prentice Hall, Englewood Cliffs, N.J. 1991. Further processing using SR and inverse SR algorithms often yields a result with higher resolution as shown by Dumont, L. R., et al., "Super-resolution of Multipath Channels in a Spread Spectrum Location System," *IEEE Electronic Letters*, Vol. 30, No. 19, pp. 1583–1584, Sep. 15, 1994 and as shown by Fattouche et al., U.S. Pat. No. 5,570,305 issued October, 1996, and as shown by Ziskind, I, et al., "Maximum Liklihood Localization of Multiple Sources by Alternating Projection," *IEEE Transactions on Acoustics, Speech, and Signal Processing*, Vol. ASSP-36, No. 10, October, 1988. It is proposed to use SR and inverse SR algorithms to improve the resolution of the WLS beyond the Rayleigh resolution, as opposed to Dent, U.S. Pat. No. 5,404,376 issued Apr. 4, 1995;
Dunn et al., U.S. Pat. No. 5,600,706 issued Feb. 4, 1997;
Khan et al., U.S. Pat. No. 5,646,632 issued Jul. 8, 1997;
Ghosh et al., U.S. Pat. No. 5,646,632 issued Apr. 16, 1996;
Krasner, U.S. Pat. No. 5,663,734 issued Sep. 2, 1997; and
Krasner, U.S. Pat. No. 5,781,156 issued Jul. 14, 1998;

which do not further process the correlation peak.

The Effect of the Observation Interval, $T_i$:

The Observation interval, $T_i$, is directly related to the energy $E_i$ in the received signal $r_i(t)$ at the MR since $$E_i = \int_0^{T_{i,k}} |r_i(t)|^2 dt \quad (27)$$

It is also related to the steady state response of a filter in such a way that the response of the filter reaches its steady state as long as $$T_i \geq \frac{1}{BW_i} \quad (28)$$

where $BW_i$ is the bandwidth of the filter that is processing $r_i(t)$.

time delays, $\Delta t_i$: The propagation delay $\tau_i$ is affected by $\Delta t_i$ which represents the system delay through antenna, cables, filters, amplifiers, etc. When $\Delta t_i$ changes from one BST to another independently from the RR, it has to be estimated otherwise the propagation delay can vary significantly from one received signal to another.

interference, $\tilde{I}_i(t)$: Depending on the level of interference, $\tilde{I}_i(t)$ can have a drastic effect on the accuracy of the estimated phase and may saturate the RF front end of the receiver. Its effects can be mitigated with both analog and idgital hardware, as well as adequate software, whether it is in-band or out-of-band.

multipath, $MP_i(t)$: The multipath $MP_i(t)$ is equivalent to an extra delay over the propagation channel and has to be either estimated and removed, or mitigated. In the case the estimated time delay, $\tau_i$, is used to solve for the TDOA between the received signal $r_i(t)$ and the received signal $r_j(t)$, the difference in multipath, $MP_i(t)-MP_j(t)$, is the distorting factor which has to be mitigated.

The effect of Multipath, $MP_i(t)$:

When multipath is considered, the accuracy of the AMPs land-based WLS could potentially degrade even further. The cellular frequency band is between 824 and 894 MHz and the propagation characteristics at these UHF frequencies will have a significant impact on positioning by multilateration as shown in Parsons D., "*The Mobile Radio Propagation Channel*," John Wiley & Sons, New York, 1992. That the ranges measured correspond to Line Of Sight (LOS) distances is a major assumption made when estimating position by multilateration. Although the dominant transmission mode in this band is LOS, reflections from natural and man-made objects as well as diffraction around said objects are also possibilities. Multipath and diffraction allow the cellular signal to propagate in heavily built up areas as well as indoors. However, they also cause the measured ranges to be longer than the true LOS distance which introduces error into the multilateration process. In addition, the propagation distance at UHF is relatively short. This allows frequency reuse in the cellular system but limits the number of observables in the multilateration process. For instance, in a dense urban environment with a delay spread of 3 microseconds (as shown in Hata, M., "Empirical Formula for Radio Propagation Loss in Land Mobile Radio Services," *IEEE Transactions on Vehicular Technology*, Vol. VT-29, No. 3, August 1980) multipath causes the location accuracy to degrade to more than 1400 m RMS. Once again, the reason for this is that the correlation function from which the multipath may be estimated has a resolution which is limited to that of the Fourier transform which implies that any multipath within such a resolution is unresolvable using traditional methods. Further processing using an inverse SR algorithm often yields a result with higher multipath resolution as shown by Dumont, L. R., et al., "Super-resolution of Multipath Channels in a Spread Spectrum Location System," *IEEE Electronic Letters*, Vol. 30, No. 19, pp. 1583–1584, Sep. 15, 1994 and as shown by Fattouche et al., U.S. Pat. No. 5,570,305 issued October, 1996, and as shown by Ziskind, I. et al., "Maximum Likelihood Localization of Multiple Sources by Alternating Projection," *IEEE Transactions on Acoustics, Speech, and Signal Processing*, Vol. ASSP-36, No. 10, October, 1988. Another approach to multipath resolution is due to Morley, G. D. et al., "Improved Location Estimation with pulse-ranging in presence of shadowing and multipath excess-delay effects," *Electronics Letters*, Vol. 31, No. 18, pp. 1609–1610, Aug. 31, 1995. It is proposed to use SR and inverse SR algorithms to better resolve the multipath components in the received radio signal, as opposed to Dent, U.S. Pat. No. 5,404,376 issued Apr. 4, 1995;

Dunn et al., U.S. Pat. No. 5,600,706 issued Feb. 4, 1997;

Khan et al., U.S. Pat. No. 5,646,632 issued Jul. 8, 1997;

Ghosh et al., U.S. Pat. No. 5,646,632 issued Apr. 16, 1996;

Krasner, U.S. Pat. No. 5,663,734 issued Sep. 2, 1997; and

Krasner, U.S. Pat. No. 5,781,156 issued Jul. 14, 1998;

which do not further process the correlation peak.

Choices of Tones for Solution IV:

There are existing tones and there are generated tones. Both types of tones carry the MR Location Information in their phases (mod $2\pi$).

Existing Tones in the periodic pilot sequence:

When the received signal, $r_i(t)$, is periodic (e.g. the pilot signal in IS-95, the CA-code in GPS), it can be approximated using Fourier series, or equivalently, a number of tones can be used to approximate the pilot sequence:

$$s_i(t-\tau_i) = \sum_{n=-\infty}^{\infty} c_n \exp[2\pi n f_m(t-\tau_i)] \quad (29)$$

where $f_m$ is the fundamental frequency of the pilot sequence;

$\tau_i$ is the propagation delay at the antenna of the $i^{th}$ BST; and $c_n$ is the complex Fourier Coefficient of the pilot sequence.

Using equation (30) below one can estimate the TOA, $\tau_i$, as follows:

$$(t-\tau_i) = \{(\text{phase of } n^{th} \text{ term in (29)}) \text{ modulo } 2\pi\}/(2\pi n f_m) \quad (30)$$

Generated Tones using a nonlinear operation on the pilot sequence:

When the received signal, $r_i(t)$, is cyclo-stationary, it generates a tone when a nonlinear operation is performed over it. The phase of such a tone carries location information regarding the MR. Most digital signals are cyclo-stationary and the generated tone is usually at the symbol rate (except in CDMA where the generated tone is the chipping rate).

In the case when the BSTs are AMPS/TDMA/GSM-based, taking advantage of the cyclo-stationary nature of the received signal is particularly important since in this case, it is not important to have a clean replica of the received signal. After performing the nonlinear operation on the received signal, a tone is generated of known (or estimated) frequency. This implies that the duration of observation can be extended as long as there is a signal to be received, i.e. as long as a call is in progress regarding a CT. This leads to an improved SNR for the received signal as explained in the CRLBs shown above.

The practical description introduces methods and apparatus to estimate $\tau_i$ and to mitigate its sources of errors.

4. $f_i$: In the kinematic case where the MR moves with respect to the BSTs, the speed and Direction Of Travel (DOT) of the MR is of interest. The only source of information one can use to extract an independent equation for the speed and DOT of the MR is $$f_i = \delta f_i - \Delta f_o + \Delta f_i \quad (31)$$

which can be used to estimate the Doppler shift $\delta f_i$. This is explained in FIG. 4 which assumes a three antenna system: the antenna at the $m^{th}$ BST with coordinates $(x_m, y_m, z_m)$, the antenna at the $k^{th}$ BST with coordinates $(x_k, y_k, z_k)$ and the antenna of the $n^{th}$ BST with coordinates $(x_n, y_n, z_n)$. In this case, the FOAs: $f_m$, $f_k$ and $f_n$ are related to the Direction Of Travel (DOT), $\phi$, relative to Northing (clockwise), to the relative speed of travel, v, with respect to the BSTs, and to the frequency offsets $\Delta f_i$, as follows:

$$f_m = f_c + \delta f_m - \Delta f_o + \Delta f_m = f_c + v/\lambda \cos(\phi - \Lambda_m) - \Delta f_o + \Delta f_m \quad (32a)$$

$$f_k = f_c + \delta f_k - \Delta f_o + \Delta f_k = f_c + v/\lambda \cos(\phi - \Lambda_k) - \Delta f_o + \Delta f_k \quad (32b)$$

$$f_n = f_c + \delta f_n - \Delta f_o + \Delta f_n = f_c + v/\lambda \cos(\phi - \Lambda_n) - \Delta f_o + \Delta f_n \quad (32c)$$

where
- $\Lambda_m$ is the clockwise angle from Northing to the line formed by $(x_m, y_m)$ and $(x,y)$,
- $\Lambda_k$ is the clockwise angle from Northing to the line formed by $(x_k, y_k)$ and $(x,y)$,
- $\Lambda_n$ is the clockwise angle from Northing to the line formed by $(x_n, y_n)$ and $(x,y)$, and
- $(x,y)$ are the 2-D (horizontal) coordinates of the MR.

In other words, there are three equations (32a, b and c) with 6 unknowns: $\phi$, $v$, $\Delta f_m$, $\Delta f_k$, $\Delta f_n$ and $\Delta f_o$. This is a problem that can be resolved if the frequency offsets: $\Delta f_m$, $\Delta f_k$, $\Delta f_n$ are estimated by the RR and removed. Then we have two equations with two unknowns: $v$ and $\phi$ after using Frequency Difference Of Arrival (FDOA):

$$f_m - f_k = v/\lambda \cos(\phi - \Lambda_m) - v/\lambda \cos(\phi - \Lambda_k) \quad (33a)$$

$$f_k - f_n = v/\lambda \cos(\phi - \Lambda_k) - v/\lambda \cos(\phi - \Lambda_n) \quad (33b)$$

We refer to such a solution as Solution V. Note that in Solution V the position of the MR $(x,y)$ must be known (or estimated) prior to estimating the speed and velocity of the MR, in order to be able to know $\Lambda_m$, $\Lambda_k$ and $\Lambda_n$ in equations (33).

In processing $f_i$ to estimate $\delta f_i$, we have the following sources of errors:

- noise, $w_i(t)$: The Cramer-Rao Lower Bound provides a lower bound on the variance, $\text{var}(\delta \hat{f}_i)|_{Tone}$, of the estimate of the frequency $\delta f_i$ of a tone due to AWGN:

$$\text{var}(\delta \hat{f}_i)|_{Tone} \geq \frac{12}{SNR_i|_{Tone} \times N_i \times (N_i^2 - 1) \times 4\pi^2} \quad (34)$$

where
- $\text{var}(\delta \hat{f}_i)|_{Tone}$ is the variance of the estimate, $\delta \hat{f}_i$, of the frequency $\delta f_i$,
- $SNR_i|_{Tone} = A_i^2/(2\sigma_n^2)$ is the SNR of the tone at the MR from the antenna of the $i^{th}$ BST,
- $A_i$ is the amplitude of the tone at the MR from the antenna of the $i^{th}$ BST,
- $\sigma_n^2$ is the noise variance, and
- $N_i$ is the number of samples (which is directly related to the observation interval $T_i$).

- frequency offsets, $\Delta f_i$: As mentioned above, there are three equations (32a–32c) with 6 unknowns: $\phi$, $v$, $\Delta f_m$, $\Delta f_k$, $\Delta f_n$ and $\Delta f_o$. This problem can be resolved if the frequency offsets $\Delta f_i$ are estimated by the RR and removed.

- multipath, $MP_i(t)$: The effect of the multipath $MP_i(t)$ in this case is to add some Doppler shift to $\delta f_i$ due to dynamic (non-stationary) reflectors such as cars, buses, trucks, etc.

- interference, $\tilde{I}_i(t)$: In this case, $\tilde{I}_i(t)$ plays the same role in distorting the estimate of the frequency $\delta f_i$ as in distorting the estimate of the phase $\theta_i$ except that its effect can be reduced more significantly.

- Error in Estimating $(x,y)$: In equations (33) it is assumed that the position, $(x,y)$, of the MR is known prior to estimating its speed and DOT. This is usually not true and $(x,y)$ needs to be estimated first. The estimation of $(x,y)$ is imperfect, implying that it will contain errors that can affect the estimation of the speed of the MR and its DOT.

The practical description explains methods and apparatus to estimate $\delta f_m$, $\delta f_k$ and $\delta f_n$ and to mitigate sources of errors.

Positioning Technologies:

1. TOA/Range Positioning (Circular Multilateration)

In a 2-D (horizontal) location system it is possible to estimate the position of a MR from the range of the MR to at least two BSTs. The MR horizontal position estimate is simply the intersection of two horizontal circles with radii equal to the ranges and centered at the BSTs. This method of positioning may therefore be called circular multilateration. Ranges may be calculated by subtracting the known time of transmission $\tau_o$ of signal s(t) from the measured TOA, $\tau_i$, of signal $r_i(t)$. There are three possible solutions:

1. When the Time of Transmission, $\tau_o$, is known, we refer to the positioning technique as Range positioning.
2. When the time of transmission, $\tau_o$, is unknown, and to be estimated, we refer to the positioning technique as TOA positioning.
3. When the time of transmission, $\tau_o$, is unknown, and to be eliminated using TDOA, we refer to the positioning technique as TDOA positioning (which is discussed in the following two sections).

In Range positioning, one way of determining the time of transmission, $\tau_o$, is to use the RTD between a MR and a BST with respect to the round trip delay from the time the MR transmits a signal to the BST to the time it receives the response of the BST to the MR transmission. In this case, a minimum of two independent equations is required to solve for the two unknowns x and y. If two ranges are estimated from TOA measurements of two different BST's, then there are two solutions for MR location at the intersections of two circles centered at the two BST's. This ambiguity can be resolved by including a third range measurement from another BST, or by (approximate) angle estimation from one or more sites by examining signal strength or phase difference of arrival.

In TOA positioning, there are now three unknowns: x, y and $\tau_o$. TOAs from three BSs are required and the equation corresponding to the $i^{th}$ BST is $$\tau_i - \tau_o - \frac{1}{c}\sqrt{(x - x_i)^2 + (y - y_i)^2} = 0 \quad (35)$$

where
- $\tau_i$ is the Time Of Arrival of signal $r_i(t)$ at the MR from the antenna of the $i^{th}$ BST,
- $\tau_o$ is the time of transmission of signal s(t) from the $i^{th}$ BST,
- $(x,y)$ is the best known 2-D position of the MR,
- $(x_i, y_i)$ is the know 2-D position of the antenna at the $i^{th}$ BST where i=1, . . . , N.

When more than the minimum number of BSTs are available, as explained above, redundancy is said to exist. If a redundant set of measured TOAs contains errors, the TOAs must be adjusted in order to obtain a unique solution to the unknowns. The amount by which each TOA is adjusted is called the residual. Several methods of adjusting the observed according to some optimization criteria are available including:

General Minimum Variance Unbiased Estimation,
Best Linear Unbiased Estimation
Maximum Likelihood Estimation,
Least Squares Estimation,
Method of Moments,
General Bayesian Estimation,
Linear Bayesian Estimation,
Kalman Filtering, etc.

It is preferred to adjust the observed TOAs such that the sum of the squares of the residuals is a minimum. This is Least Squares Estimation.

Effect of Geometry on TOA Positioning

In a location system, geometry (that is the relative positions of the BSTs with respect to each other and the MR to be positioned) plays an important role as shown in equation (36)

$$std(\text{position}) = DOP \times std(\hat{R}_i) \qquad (36)$$

where
$std(\hat{R}_i)$ is the standard deviation of the range estimate $\hat{R}_i$ obtained from equations (19) or (26), and
DOP is Dilution Of Precision which is a measure of geometry.

In a 2-D location system, it is common to refer to the Horizontal DOP (HDOP) which is defined as $$HDOP = \sqrt{EDOP^2 + NDOP^2} \qquad (37)$$

where
EDOP is the East DOP and is defined as the square root of the element in the $1^{st}$ row and $1^{st}$ column of $C_{TOA}$,
NDOP is the North DOP and is defined as the square root of the element in the $2^{nd}$ row and $2^{nd}$ column of $C_{TOA}$,
$C_{TOA}$ is an unscaled matrix defined as $C_{TOA} = [A^T C_l^{-1} A]^{-1}$,
$C_l$ is the unscaled measurement covariance matrix (the identity matrix of appropriate dimension),
A is the design matrix for the model of equation (35) and is defined as $$A = \frac{1}{c}\begin{bmatrix} -\frac{x-x_1}{d_1} & -\frac{y-y_1}{d_1} & -c \\ -\frac{x-x_2}{d_2} & -\frac{y-y_2}{d_2} & -c \\ \vdots & \vdots & \vdots \\ -\frac{x-x_N}{d_N} & -\frac{y-y_N}{d_N} & -c \end{bmatrix} \qquad (38)$$

and $d_i$ is the best derived distance (range) between the MR and the antenna at the $i^{th}$ BST.

Weighting of the TOA Observations

In the position estimation process, not all TOA observations need carry the same weight. TOA observations thought to be more reliable may be weighted more heavily than those deemed less reliable. This is accomplished through the observation covariance matrix. The inverse of $C_l$ is the weight matrix. Larger values on the diagonal of $C_l^{-1}$ correspond to heavier weighting for the corresponding TOA observations. In the context of cellular telephone positioning, RSSI from each BST is one method of assigning weights to the TOAs. A high RSSI from a BST implies a reliable TOA. This is due to two facts:

1. The RSSI from a BST usually consists of received signal power+received noise power. The noise in the receiver is mainly thermal noise which is a function of bandwidth and temperature. When two BSs have comparable temperatures and bandwidths, the received noise power is approximately the same in both BSTs. Thus, a high RSSI implies a high received signal power, which in turn implies a high SNR. This is desirable.
2. Furthermore, a higher RSSI usually implies less shadowing than a lower RSSI, which in turn implies less multipath. This is also desirable.

Blunder Detection in TOA Positioning

Blunders are gross errors in the TOA observations. They may be caused by large signal level fluctuations due to either flat fading or sudden in-band interference. If unremoved, blunders cause large errors in the estimated position. It is possible to detect observations containing blunders by observing the misclosure of each observation during the iterative Least Squares process. Misclosure is defined as the value of the position model (35) given the best available position estimate (x,y). Observations containing blunders will generally have much larger misclosures than observations not containing blunders. When an observation is detected as having a blunder it may be removed from the position estimation process.

We attempt to reduce the effect of geometry, i.e. reduce the value of HDOP in (37), by allowing the MR to monitor a large number of BSTs. In cellular communications, frequency reuse and flat fading are common occurrences. Therefore, increasing the number of monitoring BSs (which probably reduces HDOP) generally increases $std(\hat{R}_i)$. As a result blunder detection is crucial as part of the method of minimizing positional error by maximizing the number of BSs (and hence reducing HDOP) without incurring a large penalty on $std(\hat{R}_i)$. In cases where blunders are not detected, poor SNR at some BSs may cause the inclusion of measurements from those BSs to increase the std(range) more than they reduce HDOP. With this trade-off in mind, the number of BSTs used to locate the MR is optimized such that std(position) in (36) is minimized.

Blunders may also be detected by a statistical analysis of the observation residuals computed from the Least Squares process as shown by Vanicek, P., Krakiwsky, E., "*Geodesy: The Concepts,*" North-Holland Publishing Company, Amsterdam, 1982. The residual of each TOA observation may be standardized by its own estimated standard deviation such that the entire set of residuals is assumed to belong to the normal distribution with zero mean and unit standard deviation. If this hypothesis is correct, the standardized residuals should fall within some specified confidence region for the standard normal distribution. An observation whose residual is flagged is suspected of containing a blunder.

2. TDOA Positioning (Hyperbolic Multilateration)

Instead of estimating the unknown time of transmission, it is possible to eliminate it. This is accomplished by differencing TOAs from two different BSTs. Since the time of transmission from both BSTs is known at both the RR and MR, it can be eliminated from the resulting TDOA (Time Difference Of Arrival). It can be shown that the locus of points for which a particular TDOA is valid corresponds to a hyperbola. The side of the hyperbola on which the MR must lie is known by the sign of the TDOA. Given TOAs from three BSs, two independent TDOAs may be formed. The intersection of the two corresponding hyperbolas estimates the position of the MR. This method is commonly referred to as hyperbolic multilateration.

The 2-D positioning method for hyperbolic multilateration is $$\Delta\tau_{ij} - \frac{1}{c}\sqrt{(x-x_i)^2 + (y-y_i)^2} + \frac{1}{c}\sqrt{(x-x_j)^2 + (y-y_j)^2} = 0 \qquad (39)$$

where
$\Delta\tau_{ij} = \tau_i - \tau_j$, $i \neq j$, and
$\tau_i$ is the Time Of Arrival of signal $r_i(t)$ at the antenna of the $i^{th}$ BST.

Effect of Geometry on TDOA Positioning

Geometry affects TDOA positioning as well. The HDOP is again calculated from (37) where the design matrix is now $$A = \frac{1}{c} \begin{bmatrix} -\frac{x-x_2}{d_2} + \frac{x-x_1}{d_1} & -\frac{y-y_2}{d_{2,m}} + \frac{y-y_1}{d_1} \\ -\frac{x-x_3}{d_3} + \frac{x-x_1}{d_1} & -\frac{y-y_3}{d_{3,n}} + \frac{y-y_1}{d_1} \\ \vdots & \vdots \\ -\frac{x-x_N}{d_N} + \frac{x-x_1}{d_1} & -\frac{y-y_N}{d_N} + \frac{y-y_1}{d_1} \end{bmatrix} \quad (40)$$

where N in (40) is the number of BSTs. Note that the TOA from the antenna of the first BST is subtracted from all other TOAs.

The unscaled observation covariance matrix is $$C_1 = \begin{bmatrix} 2 & 1 & \cdots & 1 \\ 1 & \ddots & 1 & \vdots \\ \vdots & 1 & \ddots & 1 \\ 1 & \cdots & 1 & 2 \end{bmatrix} \quad (41)$$

Weighting of the TDOA Observations

Weighting of the TDOA observations is possible. However, because the TDOAs are a function of two TOAs, the method of assigning weights is no longer straightforward.

Blunder Detection in TDOA Positioning

Blunder detection may also be performed in TDOA positioning. However, in this context, misclosures and residuals correspond to TDOAs. Therefore, a failing misclosure or residual may be due to a blunder in either of the TOA observations from which the TDOA is derived. It is not always possible to isolate the offending BST.

Multiple Solutions in TDOA Positioning

Two hyperbola halves, formed from two independent TDOAs, may intersect twice. This results in two mathematically correct solutions. This is particularly true in the case of positioning MRs where short distances and poor geometry are commonplace.

Solution bifurcation (the existence of two solutions to the positioning equations) is most often a concern in the exactly determined case. For the exactly determined case, the existence of two solutions can be detected with the method given in Chaffee, J. W. et al., "Bifurcation of Pseudorange Equations," *Proceedings of the* 1993 *National Technical Meeting*, San Francisco, Calif., Jan. 20–22, 1993, The Institute of Navigation. Although originally intended for the detection of bifurcation in the GPS (Global Positioning System), this method is equally applicable to the case of MR positioning.

When more than two TDOAs are available in the 2-D positioning case, the probability of exact solution bifurcation is extremely small. It is, however, possible for bifurcation to exist for a subset of two TDOAs. In such a case, the second solution may affect the final solution obtained when using all available TDOAs.

In any case, when solution bifurcation exists, the iterative Least Squares position estimation algorithm may converge to either of the solutions. The solution converged to is a function of the initial starting position used to begin the iterative Least Squares process. To converge to the solution corresponding to the actual position of the MR, the initial position used to begin Least Squares must be relatively accurate. Given no a priori information about the location of the MR, a closed-form position estimation algorithm, using the TOA or TDOA observations, is the only choice.

A number of closed-form positioning algorithms have been developed. Examples are, spherical interpolation (Smith, J. O., et al., "Closed-Form Least-Squares Source Location Estimation from Range-Difference Measurements," *IEEE Transactions on Acoustics, Speech, and Signal Processing*, Vol. ASSP-35, No. 12, December 1987, pp. 1661–1669), the method of Schau and Robinson (Schau, H. C., et al., "Passive source localization employing intersecting spherical surfaces from time-of-arrival differences," *IEEE Transactions on Acoustics, Speech, and Signal Processing*, Vol. ASSP-35, No. 8, August 1987, pp. 1223–1225), Bancroft's method (Bancroft, S., "An algebraic solution of the GPS equations," *IEEE Transactions on Aerospace and Electronic Systems*, Vol. AES-21, No. 7, January 1985, pp. 56–59), the method of Chan and Ho (Chan, Y. T., et al., "A Simple and Efficient Estimator for Hyperbolic Location," *IEEE Transactions on Signal Processing*, Vol. 42, No. 8, August 1994, pp. 1905–1915), and LOCA (Location On the Conic Axis) by Schmidt, R. O. "A New Approach to Geometry of Range Difference Location," *IEEE Transactions on Aerospace and Electronic Systems*, Vol. AES-8, No. 6, November 1972, pp. 821–835.

LOCA is used in the preferred embodiment of the invention. LOCA is the mathematical dual of hyperbolic trilateration. The fundamental theorem of LOCA states that TOA differences from three BSTs of known location yield a straight line of position. This straight line is the major axis of a conic. The three BSTs lie on the conic and the MR, the location of which is being estimated, lies at one of the foci of the conic. In the case of redundancy and 3-D positioning, LOCA is expanded into Plane Intersection as shown by Schmidt, R. O., "A New Approach to Geometry of Range Difference Location," *IEEE Transactions on Aerospace and Electronic Systems*, Vol. AES-8, No. 6, November 1972, pp. 821–835.

Plane Intersection is equally applicable to the case of redundancy in 2-D positioning.

In LOCA, three conics are possible: an ellipse, hyperbola, or parabola. The conic of interest depends on the relative positions of the BSTs and the MR to be positioned. Each of these conics has two foci (for the parabola one focus is at infinity) and therefore two possible solutions. In the case, of an ellipse, the correct focus is determined from the signs of the TDOAs. In the case of the parabola, the solution is obvious. When the conic is a hyperbola, however, the correct focus cannot be determined from the given TDOAs. Chaffee's method of bifurcation detection in Chaffee, J. W. et al., "Bifurcation of Pseudorange Equations," *Proceedings of the* 1993*National technical Meeting*, San Francisco, Calif., Jan. 20–22, 1993, The Institute of Navigation, will indicate bifurcation for the case of the hyperbola and no bifurcation for the cases of the ellipse and parabola. With four BSs, a second conic is obtained. The intersection of the major axes of the two conics is the MR position estimate. Hence, there is no ambiguity and bifurcation is, therefore, not of concern when using Plane Intersection in the presence of redundancy.

If the TOAs contain large errors, LOCA or Plane Intersection may give a very poor solution. When used as the initial position for Least Squares, this poor solution may cause Least Squares to diverge. In that case, the best available course of action may be to average the coordinates of the participating BSs and use that as the initial position for Least Squares. Another alternative is to use the approximate coordinates of the BST with which the MR is communicating, as the initial position.

3. Hybrid TDOA Positioning (Circular Multilateration with TDOAs)

In some cases it is desirable, or even necessary, to use TDOAs as opposed to TOAs. However, as explained above, it is not always possible to isolate blunders when using TDOAs. It is possible, however, to construct a positioning model that uses TDOAs but gives residuals and misclosures for individual TOAs.

To do this, one BST is chosen as the reference. The assumption is then made that the TOA at the reference site is equal to the time of transmission, $\tau_o$. From this point on, the development follows that of circular multilateration except that the TOA of the reference BST is subtracted from all TOAs (including that of the reference BST) instead subtracting the time of transmission. The positioning model is then $$\Delta \tau_{il} + \frac{1}{c} R_u - \frac{1}{c}\sqrt{(x-x_i)^2 + (y-y_i)^2} = 0 \qquad (42)$$

where $\Delta \tau_{il} = \tau_i - \tau_l$, i=1, - - - , N and $R_u$ is the range from the antenna of the reference (first) BST to the position of the MR.

The model of (42) has the same structure as that of circular multilateration (equation(35)) except that the third unknown is $R_u$ and not the time of transmission.

The model of (42) gives N observations, and therefore N residuals and misclosures, for N BSTs. The N observations, however, are a O and N-1 TDOAs. The structure of the equations is that of TOA positioning whereas the observations are that of TDOA positioning. Hence, the name Hybrid TDOA Positioning.

Effect of Geometry on Hybrid TDOA Positioning

The design matrix for hybrid TDOA positioning is $$A = \frac{1}{c}\begin{bmatrix} -\frac{x-x_1}{d_1} & -\frac{y-y_1}{d_1} & 1 \\ -\frac{x-x_2}{d_2} & -\frac{y-y_2}{d_2} & 1 \\ \vdots & \vdots & \vdots \\ -\frac{x-x_N}{d_N} & -\frac{y-y_N}{d_N} & 1 \end{bmatrix} \qquad (43)$$

Note that (43) is the same as (38) except for the third column which corresponds to the third unknown.

The unweighted and unscaled observation covariance matrix, $C_l$, is the same as that for TOA positioning, the identity matrix of dimension N.

DOPs may be calculated, as before, from $[A^T C_l^{-1} A]^{-1}$.

Weighting of the Hybrid TDOA Observations

Although the observations are, strictly speaking, TDOAs, they may be treated as observations corresponding to the individual BSTs. That is, the first observation, which is always zero, may be viewed as the observation of the reference (or first) BST. The second observation, consisting of the TOA of the reference BS subtracted from the TOA of the second BST, is treated as the observation of the second BST, and so on. Therefore, the N diagonal elements of $C_l$ may be weighted for the individual BSTs.

Blunder Detection in Hybrid TDOA Positioning

In like manner, N independent misclosures and residuals, one for each BST, are available for analysis. Blunder detection may then be performed as in the case of TOA positioning and blunders in individual TOA observations may be detected.

Multiple Solutions in Hybrid TDOA Positioning

Since the observations used are actually TDOAs, this method of positioning is subject to solution bifurcation. The method of dealing with multiple solutions discussed under hyperbolic multilateration is equally applicable here.

4. AOA Positioning:

Given unambiguous AOA measurements, only two unknowns exist for position estimation—the 2-D coordinates of the MR to be positioned. Therefore, a minimum of two independent AOA measurements are required. Again let (x, y) be the 2-D coordinates of the MR and ($x_i$, $y_i$) the 2-D coordinates of the antenna of the $i^{th}$ BST. At the antenna of the $i^{th}$ BST, the AOA, $\Lambda_i$, is measured, where:

$\Lambda_i$ is the clockwise angle from Northing to the line joining the MR to the antenna of the ith BST (similar to $\Lambda_i$ in equations (32) and (33); not to be confused with $\gamma_i$ in equations (15), (16), (21), (22) and (23)).

The mathematical positioning model is then $$(x-x_i) \cos \Lambda_i - (y-y_i) \sin \Lambda_i = 0 \qquad (44)$$

When more than two independent AOA observations are available, Least Squares may be used to obtain a unique solution.

Effect of Geometry on AOA Positioning

The relative positions of BSTs with respect to each other and the MR to be positioned are also important for AOA positioning. DOP may again be used to quantify geometry. From the 2-D positioning model (44), the design matrix is found to be $$A = \begin{bmatrix} \cos\Lambda_1 & -\sin\Lambda_1 \\ \cos\Lambda_2 & -\sin\Lambda_2 \\ \vdots & \vdots \\ \cos\Lambda_N & -\sin\Lambda_N \end{bmatrix} \qquad (45)$$

The unscaled and unweighted observation covariance matrix, $C_1$, is the identity matrix of dimension N. The DOPs can again be found from $[A^T C_1^{-1} A]^{-1}$.

Weighting of the AOA Observations

The individual AOA observations may be weighted through the observation covariance matrix $C_1$. Those AOA observations deemed more reliable are assigned a smaller variance, or conversely, a heavier weight.

Blunder Detection in AOA Positioning

As in the case of TOA or TDOA observations, AOA observations may contain blunders. When redundant observations are available, statistical testing of the observation residuals and misclosures may be used to detect observations which contain blunders.

Notes:

1. As mentioned above, the AOA solution in equation (15) has an ambiguity problem which can be resolved either by
   using TDOA as well as AOA as explained in the next section, or
   using more than two antennas at the same BS. This is possible in sectorized cells since each sector has usually two diversity antennas. In other words, in a three sector cell a total of six antennas could be available.

2. When the diversity antennas are separated only vertically, the estimated AOA is the elevation angle. In this case, it is possible to use both diversity antennas since they are independent from each other, i.e. they offer independent observations. Diversity observations may be combined by well-known methods including selection combining, maximal ratio combining, co-phasing combining, equal gain combining, or other methods.

5. AOA/TDOA Positioning:

Least Squares allows for the combination of different types of observations. In particular, it is possible to estimate 2-D position using both AOA observations and TDOA observations within a single Least Squares adjustment.

A combination of the two different observation types is particularly useful in situations where only two BSTs are available for estimating the 2-D position of a MR. When two BSTs are used to estimate the incoming signal AOA for these BSTs, numerous AOA ambiguities are possible as shown in equation (15). This is due both to the nature of AOA estimation with a 1-D linear array, and to the fact that the spacing between antennas can be greater than one wavelength. Therefore, with two independent AOA observations only, many position solutions are possible and there is no way of determining which of the many solutions is correct.

If, however, in addition to the two independent AOA observations, TOA is also measured at each one of two distant BSTs (maybe using $p_i(t-\tau_i+\tau_{o,i}-\Delta t_i)$ in equation (20)), a TDOA can be calculated. This TDOA corresponds to a hyperbola side which, in the absence of error, will cross through the intersection point of two of the many bearing lines derived from the ambiguous AOAs.

When the AOA and TDOA observations include error, no two bearing lines and the measured hyperbola side will exactly intersect. For the measured TDOA and any two particular AOAs, Least Squares will give the position solution which minimizes the sum of the squares of the residuals. Observation residuals are available since there are two unknowns, the 2-D coordinates, with three independent observations (2 independent AOAs and 1 TDOA).

In order to separate the correct AOA pair from the ambiguities, each AOA combination is combined with the TDOA observation in Least Squares. That combination of AOAs which results in the smallest sum of squares of residuals is chosen as correct. The corresponding position solution is used as the MR position estimate.

When combining AOA and TDOA observations in Least Squares, both the model for AOA positioning (44) and the model for TDOA positioning (39) are used. Without loss of generality, the design matrix A for two independent AOA observations and one TDOA observation is $$A = \begin{bmatrix} \cos\Lambda_1 & -\sin\Lambda_1 \\ \cos\Lambda_2 & -\sin\Lambda_2 \\ -\frac{x-x_2}{d_2}+\frac{x-x_1}{d_1} & -\frac{y-y_2}{d_2}+\frac{y-y_1}{d_1} \end{bmatrix} \quad (46)$$

where $d_i$ is the best derived distance between the MR and the $i^{th}$ BST. Note that the first two rows correspond to the two AOA measurements whereas the third row corresponds to the TDOA measurement. The two columns correspond to the two unknowns, x and y. Additional AOA and TDOA measurements may be included by adding appropriate rows to (46). Note that the 1/c factor seen in (40) is missing in the TDOA measurement row of (46). This is done such that the units throughout A are dimensionless.

The misclosure vector, necessary for the Least Squares adjustment mechanism, merely consists of the misclosures of all observations. The misclosure vector corresponding to the design matrix of (46) is $$w = \begin{bmatrix} (x-x_1)\cos\Lambda_1 - (y-y_1)\sin\Lambda_1 \\ (x-x_2)\cos\Lambda_2 - (y-y_2)\sin\Lambda_2 \\ c*\Delta\tau_{12} - \sqrt{(x-x_1)^2+(y-y_1)^2} + \sqrt{(x-x_2)^2+(y-y_2)^2} \end{bmatrix} \quad (47)$$

where $\Delta\tau_{12}=\tau_1-\tau_2$.

Since the AOA and TDOA observations are independent, the unscaled observation covariance matrix is the identity matrix of appropriate dimension (number of AOA observations plus the number of TDOA observations).

Effect of Geometry on AOA/TDOA Positioning

DOP may again be used to quantify geometry. The DOPs (HDOP, EDOP, NDOP) can be found from $[A^T C_1^{-1} A]^{-1}$ where A and $C_1$ are defined immediately above.

Weighting of the AOA/TDOA Observations

The individual AOA and TDOA observations may be weighted through the observation covariance matrix $C_1$. Those AOA and/or TDOA observations deemed more reliable are assigned a smaller variance, or conversely, a heavier weight.

Blunder Detection in AOA/TDOA Positioning

Both the TDOA and AOA observations may contain blunders. Statistical testing of the observation residuals and misclosures may be used to detect observations which contain blunders.

6. AOA/Range Positioning:

If the time of transmission or round-trip delay is known, the range, $\hat{R}_i$, from the MR to the $i^{th}$ BST is the observed parameter. In that case, AOA and range positioning may also be combined in order to estimate the position of the MR with three BSTs. Without loss of generality, the design matrix A for two AOA observations and one range observations is $$A = \begin{bmatrix} \cos\Lambda_1 & -\sin\Lambda_1 \\ \cos\Lambda_2 & -\sin\Lambda_2 \\ -\frac{x-x_1}{d_1} & -\frac{y-y_1}{d_1} \end{bmatrix} \quad (48)$$

The misclosure vector corresponding to this design matrix is $$w = \begin{bmatrix} (x-x_1)\cos\Lambda_1 - (y-y_1)\sin\Lambda_1 \\ (x-x_2)\cos\Lambda_2 - (y-y_2)\sin\Lambda_2 \\ \hat{R}_1 - \sqrt{(x-x_1)^2+(y-y_1)^2} \end{bmatrix} \quad (49)$$

Since the AOA and range observations are independent, the unscaled observation covariance matrix is the identity matrix of appropriate dimension (number of AOA observations plus the number of range observations).

On the other hand, without loss of generality, the design matrix A for one AOA observations and two range observations is $$A = \begin{bmatrix} \cos\Lambda_1 & -\sin\Lambda_1 \\ -\frac{x-x_1}{d_1} & -\frac{y-y_1}{d_1} \\ -\frac{x-x_2}{d_2} & -\frac{y-y_2}{d_2} \end{bmatrix} \quad (50)$$

The misclosure vector corresponding to this design matrix is $$w = \begin{bmatrix} (x-x_1)\cos\Lambda_1 - (y-y_1)\sin\Lambda_1 \\ \hat{R}_1 - \sqrt{(x-x_1)^2 + (y-y_1)^2} \\ \hat{R}_2 - \sqrt{(x-x_2)^2 + (y-y_2)^2} \end{bmatrix} \quad (51)$$

Effect of Geometry on AOA/Range Positioning

DOP may again be used to quantify geometry. The DOPs (HDOP, EDOP, NDOP) can be found from $[A^T C_1^{-1} A]^{-1}$ where A and $C_1$ are defined immediately above.

Weighting of the AOA/Range Observations

The individual AOA and range observations may be weighted through the observation covariance matrix $C_1$. Those AOA and/or range observations deemed more reliable are assigned a smaller variance, or conversely, a heavier weight.

Blunder Detection in AOA/Range Positioning

Both the AOA and range observations may contain blunders. Statistical testing of the observation residuals and misclosures may be used to detect observations which contain blunders.

7. Speed and Direction of Travel Estimation:

In a kinematic location system, the 3-D or 2-D location of the moving MR must be estimated at various epochs of time. In addition, the doppler shift of the signal transmitted from each BST may be estimated as discussed earlier.

The equations relating the frequency (including Doppler shift) of the arriving signal at the MR from the BST 1. to the relative speed of the MR with respect to the BSTs,
2. to its DOT and
3. to the frequency offset inherent in each BST are given in equations (35).

The estimation model for speed and DOT is, therefore, $$f_i - v/\lambda \cos(\phi - \Lambda_i) - \Delta f_i + \Delta f_0 = 0 \quad (52)$$

where $\Delta f_i$, the frequency offset for th $i^{th}$ BST, is assumed to be known by the RR. Given that at any particular epoch the position of the MR (x, y) is estimated by one of the above methods, the angle $\Lambda_i$ in (52) may be calculated for each BST. In equation (52) then, the knowns are $f_i$, $\lambda$, $\Delta f_i$ and $\Lambda_i$, (where $f_i$ is measured or observed), and v, $\phi$ and $\Delta f_0$ are the unknowns. Three BSTs are required—the same number required to estimate the 2D MR position using TOA or TDOA positioning.

Effect of Geometry on Speed and Direction of Travel Estimation:

Geometry affects the estimation of speed and DOT as well. For instance, it is intuitively obvious that when the MR is traveling on a line perpendicular to the line connecting it and a BST, no information regarding the speed of the MR is available from observed data at that BST.

The design matrix for the model of (52) is $$A = \begin{bmatrix} -\dfrac{\cos(\varphi - \Lambda_1)}{\lambda} & \dfrac{v}{\lambda}\sin(\varphi - \Lambda_1) & -1 \\ -\dfrac{\cos(\varphi - \Lambda_2)}{\lambda} & \dfrac{v}{\lambda}\sin(\varphi - \Lambda_2) & -1 \\ \vdots & \vdots & \vdots \\ -\dfrac{\cos(\varphi - \Lambda_N)}{\lambda} & \dfrac{v}{\lambda}\sin(\varphi - \Lambda_N) & -1 \end{bmatrix} \quad (53)$$

The DOPs can again be found from $[A^T C_1^{-1} A]^{-1}$. In this case the DOPs will be speed DOP, direction of travel DOP, and frequency offset DOP. $C_1$ is the unscaled and unweighted identity matrix of dimension N.

Practical Description of the Invention:

Forcing a CT to act as an MR:

In a handset-based WLS, it is desirable to be able to use a cellular BS as a BST and to request a CT to act as an MR in order to fulfill the FCC mandate for E911 as well as to offer location services to the current 60 million cellular subscribers in North America who are expected to grow to 120 million by the year 2001. This however might require a change to the CT as well as a change in the cellular standards. If the required changes preclude existing CTs, the FCC mandate for E911 will not be fulfilled using such a system. Nonetheless, a handset-based solution is attractive since it can offer an accuracy comparable to the one offered by systems dedicated for location such as GPS and Loran-C. This is why it is still acceptable to make changes to the CT regardless of the FCC mandate.

Some changes to the CT might require changes to the standard. We emphasize CT changes while attempting to reduce the changes to the standard. Three levels of CT modification are identified as follows:

1. modification 0 which requires no modifications to the CT;
2. modification I which requires only software modifications to the existing CT; and
3. modification II which requires both software and hardware modifications to the existing CT.

A hardware modification to the existing CT is required when a required change in the signal processing algorithms cannot be accomplished in software. This may be due to required changes (e.g. a change in the RF front end, in the antennas or in the mixers) which cannot be performed in software; or due to the fact that the digital hardware is not adequate to perform some tasks in software (e.g. when using ASIC chips instead of general purpose DSP chips in the existing CTs).

It is proposed here to improve modification 0, I and II over existing methods. In this case, existing methods rely only on pilot signals transmitted from cellular sectors to locate the CT. More specifically, existing methods describe a typical operation of a CT, which searches for pilots and determines their TOAs. However, this normal mode of operation of a CT is designed to maximize the performance of the CT in receiving data signals, and to maximize the communications performance (i.e. capacity of the system, reliability of data transmission, etc.). Improvement 0 introduces Location state 0 which the CT enters into whenever it is requested to locate itself in modification 0. Location state 0 optimizes several design parameters in modification 0 as follows: Improvement 0: The most common method to estimate the TOAs, POAs, Strength of Arrival (SOAs), and FOAs of received signals at the MR consists of correlating a received signal with a clean version of itself. Conventional methods cannot resolve correlation peaks beyond the conventional time-domain Rayleigh resolution. Moreover, conventional methods either choose the highest correlation peak above a certain threshold or the peak corresponding to the first arrival above a given threshold. Over a miltipath channel, it is possible to assume that the first peak above a certain threshold corresponds to the correct peak, however, aliasing, noise, and interference can cause spurious peaks to appear in time before the correct one. It is an object of Improvement 0 to 1. optimize the threshold used in selecting the correlation peak; and to
2. optimize the list of BSs considered for correlation.

Such an optimization is based on minimizing HDOP. The optimized parameters: threshold and list of BSs, are then transferred to the CT whenever it is requested to enter into Location state 0. In such a state, the CT is forced to receive more signals from more BSTs in order to reduce HDOP. The optimization process can be explained as follows. In order for the CT to receive more signals, its threshold has to be lowered. A lower threshold however forces the CT to accept weak signals. This produces low SNR signals that might suffer from multipath and interference. In order to minimize HDOP while at the same time reducing the effect of noise and multipath, the optimization process consists of solving for the position of the MR using Least Squares weighted by the individual RSSI from each received signal.

In modification I, existing methods require a great deal of standard change. Instead, Improvement I does not require a standard change. It forces the CT to enter into Location state I:

Improvement I: It consists of using the SR and Inverse SR algorithms over the correlation function (that is obtained by correlating the received signals at both the MR and RR with a clean version of themselves) in order to:

1. resolve the correlation peaks beyond the conventional time-domain Rayleigh resolution; and to
2. avoid using a threshold in selecting the correlation peak.

An important feature in the Inverse SR algorithm is the fact that it generally produces a number of correlation peaks:
a peak corresponding to the direct path signal as well as,
a number of spurious peaks caused by noise, aliasing, multipath and interference, that can surround the correct peak.

Instead of using a threshold, Location state I consists of selecting the correlation peak that produces the smallest residual when performing a weighted Least Squares operation on all possible correlation peaks resulting from super-resolving the correlation functions produced from the received signals using the inverse SR algorithm. It is also an object of Location state I to optimize the list of BSs considered for correlation based on minimizing HDOP.

In modification II, existing methods require a great deal of standard change as well as CT change. More specifically, it consists of receiving GPS signals partly at the CT and partly at the RR. Instead, several improvements over the existing methods are offered in modification II:

It allows the CT to choose between receiving cellular signals, or receiving non-cellular signals (such as GPS, Loran-C, etc.), or both;
It allows the CT to use Improvement 0 and/or Improvement I, i.e. to enter into Location state 0 and/or Location state I;
It allows the CT to use the carrier phase of the received signals for TDOA location;

It allows the CT to use AOA for GPS/Loran-C;
It allows the CT to locate itself using only two independent BSs, with a minimum of two sectors per BS, when using AOA estimation;
It allows the CT to use dual-frequency receivers for GPS;
It allows the CT to use Pseudolite in GPS;
It allows the CT to use cellular augmented GPS;
It allows the CT to use short messaging either for transmitting its Location Information or for receiving the Reference Information, so as not to be network-dependent;
It allows the CT to combine location information from both GPS and cellular signals. GPS alone requires four satellites in order to solve for (x,y,z,) and the CT's clock error. Cellular alone require three BSs in order to solve for (x,y) and the CT's clock error. When combining GPS equations with cellular equations, we require four equations in total since we still have four unknowns: x, y, z, and the CT's clock error. A possible alternative is to replace z by the altitude of the BSs. However, this can introduce an error in the estimation for x and y;

Description of an IS-95 CT receiving Pilot Signals:

Here it is proposed to use an IS-95 receiver which measures the TOA of multiple pilot signals for use in estimating the location of said receiver. This receiver may be obtained through modifications to the operation of a wide variety of CDMA receivers, including CDMA CTs.

An IS-95 CT is directed to enter location state 0 or Location State I by an order received from:

1. a remote location,
2. an order received from the user of the CT, or
3. by other predetermined circumstances, such as initialization on power-up, or origination of a CT.

Upon entering location state 0 or I, 1. the CT assembles a list of pilots to search for (1011) as shown in FIG. 10. This list may be formed from a combination of the CT's Active set, neighbour set, remaining set, and a list of pilots specified in a message received by the CT from a remote source.
2. The process of searching for pilots, and assigning a demodulator finger to obtain a refined TOA estimate, is executed for each pilot in the pilot search list. In blocks (1012), (1013), (1014), (1015), (1016), (1017), and (1018), P represents one of the pilots from the list. Block (1012) initializes P to the first pilot in the search list.
3. A searcher element is assigned to search for pilot P in the received signal (1013). A window of PN offsets (start and end, or center and width) is specified to the searcher. The searcher then computes received energy of pilot P at multiple delay offsets within the search window. In the preferred embodiment, these delay offsets are spaced one half chip apart (0.4069 microseconds). For each delay offset, the searcher accumulates received pilot energy over a specified duration of time. (preferred embodiment uses 0.5 ms)
4. The searcher results are examined for evidence of reception of a pilot signal with sufficient quality (1014). In the preferred embodiment, the ratio of the average pilot chip energy to the total received power (called $E_c/I_o$) is computed at each delay offset. FIG. 11 illustrates a possible set of values for searcher results. In this example, significant pilot energy appears near delay offset 7. The pilot $E_c/I_o$ at each delay offset is compared to a threshold value (−15 dB in the preferred embodiment). If the $E_c/I_o$ at one or more delay offsets exceed the threshold, then the earliest such delay offset is used as an initial estimate of the time of arrival of the pilot. If the threshold is not exceeded at any of the delay offsets, then it is determined that the pilot was not detected.

5. If pilot P was detected, then a demodulator finger is assigned to pilot P at the initial estimate of the time of arrival of said pilot (1015). The finger is allowed to track pilot P for a period of time (preferred embodiment uses 2 ms), after which 6. the delay offset of the finger is retrieved and stored as the time of arrival of pilot P (1016).

7. After the searcher is finished searching for pilot P, P is assigned to the next pilot in the list (1017), (1018).

8. If the list is exhausted, then the search results are assembled (1019) for subsequent processing or transmission to a remote site.

FIG. 10 illustrates steps performed sequentially. Some steps could be performed in parallel. Specifically, the searcher can begin to search for another pilot while a demodulator finger tracks a previously found pilot.

If the CT's time reference is not sufficiently stable, then one demodulator finger can be assigned to one pilot while other pilots are searched and tracked by other fingers, in order to maintain a known time reference.

A demodulator finger may track a pilot using a delay-locked loop, as described in U.S. Pat. No. 5,764,687. This results in the finger moving to the peak of the arrival of the pilot. Improved performance may be obtained by having a finger track towards a predetermined $E_c/I_o$ threshold on the rising edge of the pilot energy versus delay offset.

Signal processing:

The location operation is performed at the Host which can be either located within the MR (Option I) or remotely from the MR (Options II and III) (e.g. within the RR or a TR). In Options II and III, it is preferable to perform as much of the processing as possible at the MR in order to reduce the amount of information transmitted from the MR to the Host. For example, if TDOA is employed for location, it is preferable to measure the TOA of a received signal, $r_i(t)$, that is transmitted from the $i^{th}$ BST, at the MR. The same is true for PDOA and FDOA. In the TOA case and in the POA case, the required processing consists of correlating the received signal with a clean version of $p_i(t)$ and sending the information regarding the correlation peaks to the Host. In the FOA case, the required processing consists of correlating the received signal with several clean versions of the $p_i(t)$ at different frequencies and sending the information regarding the correlation peaks to the Host.

The correlation peaks between $r_i(t)$ and a clean version of $p_i(t)$ can be super-resolved using SR algorithms. It is sometimes preferable to perform the SR algorithms at the Host rather than performing them at the MR since it requires a number of computationally intensive operations that are easier to develop at the Host than at the MR. This implies that the correlation peak needs to be transferred to the Host which does not represent a large amount of information and can be easily transferred to the Host.

In order to be able to correlate the received signal, $r_i(t)$, at the MR, a clean version of $p_i(t)$ must be available at the MR beforehand. In order to avoid correlating $r_i(t)$ with $p_i(t)$, one can use either one of the following two procedures:

Procedure I:
1. Filter the entire received signal;
2. Extract the phase of an existing tone. In this case, TOA and AOA information are contained in the phase of the tone while the FOA information are contained in the frequency of the tone and can be extracted using Procedure III (see below).

Procedure II:
1. Filter the entire received signal;
2. Perform a nonlinear operation on the filtered signal;
3. Extract the phase of a tone generated by the nonlinear operation in step 2. In this case, TOA and AOA information are contained in the phase of the tone while the FOA information are contained in the frequency of the tone and can be extracted using Procedure III.

The nonlinear operation in Procedure II can be either a quadratic operation (e.g. squaring the signal), a delay product operation (i.e. multiplying the signal by a delayed version of itself) or any other suitable nonlinear operation.

Procedures I and II can be used both for acquiring the signal and for estimating its TOA. This is accomplished by stamping the time using a reliable clock at either the start of the generated tone or obtaining the time stamp at the end of the observation window (the latter is preferred).

Procedures I and II can be improved by resolving the existing or generated tones using SR and inverse SR algorithms. Moreover, the filtering required in step 1 of Procedure II can be carried out in the digital domain in order to reduce the effect of temperature and aging on group delay variation.

Procedures I and II can be improved by repeating them a number of times and then either averaging the Location Information or averaging the TDOA, PDOA or FDOA between pairs of BSTs.

An alternative method for improving Procedures I and II is by substantially increasing the duration of observation, $T_i$, of the received signal, $r_i(t)$, thereby increasing the received SNR. In order to be able to increase $T_i$ at will, $p_i(t)$ has to be available at the MR. An important feature in Procedure II is the fact that the signal $r_i(t)$ transmitted by the $i^{th}$ BST does not have to be a deterministic signal, i.e. a clean replica of the signal does not have to be available at the MR. Equivalently, an important feature in Procedure II is the fact that the probability of location is 100%, unlike Procedure I which is below 100%. This leads to the fact that in Procedure II, increasing the duration of observation, $T_i$, can accommodate different situations. For example, in rural areas, where the cells are large, the SNR can be increased by increasing the duration of observation. Or equivalently, if the geometry is not good (i.e. HDOP is large, e.g. highway), one can improve it by increasing the duration of observation hence, increasing the number of BSTs that receive the signal $r_i(t)$ at a reasonable level. The duration of observation is thus preferably optimized with respect to the SNR and HDOP. In addition to reducing HDOP by increasing the number of BSTs, this also leads to reducing the effect of multipath, particularly in urban centers.

In order to reduce the effect of in-band interference on the phase of the desired tone, narrowband digital filters of a few hertz bandwidth are used (e.g. Fourier Transform-based filters, sliding Fourier Transform-based filters, IIR filters, FIR filters, etc . . . ). The Fourier Transform-based filter has a bandwidth which is a function of the observation duration, $T_i$. The IIR filter has a steady state response time which is a function of $T_i$. In other words, the observation duration $T_i$, has to be selected in order to optimize the SNR (increase it)

versus the bandwidth of the filter (decrease it) versus the response time of the wireless location system (minimize it).

In order to reduce the effect of the multipath, $MP_i(t)$, on the performance of a kinematic wireless location system, it is desirable to resolve the different Doppler frequencies $\delta f_i$ (which correspond to different TOAs and different AOAs) and to choose the frequency corresponding to the first arrival. The method of resolving the different frequencies can be accomplished using SR algorithms.

Hardware

In order to improve over prior art for modification II, one should attempt to 1. reduce or avoid:
   Grain Imbalance;
   Phase Imbalance;
   Carrier Feed-through; and
   DC offset,
2. be able to use the same RF front end for all standards (analog or digital) over a fixed band; and
3. reject out-of-band Interferers (e.g. paging, trunked radio, etc.) using digital filters in the Digital Signal Processor (DSP).

To achieve the three objectives above, it is proposed to use a linear IF-sampling receiver for the MR, or for the RR, or for both. Such an IF-sampling receiver is designed to have high rejection, low group delay variation and good sensitivity. In order to have high rejection with good sensitivity, the receiver is designed to have (see FIG. 8):

Design I:

1. A number of Intermediate Frequency (IF) stages (810) that convert the received RF signal $\text{Re}\{\tilde{r}_r(t)\exp(j2\pi f_c t)\}$ (801) to an IF signal (807) of IF frequency $f_1$. Initial rejection is achieved at RF using an RF Band Pass Filter (BPF) (802), followed by an RF amplifier (803) for good sensitivity. Subsequent rejections are achieved at each IF stage which consist of a mixer (804) followed by an Intermediate Frequency (IF) BPF filter (805) and an IF amplifier (806).
2. A pre-aliasing filter (811) precedes the Analog-to-Digital converter (812) that converts the IF analog signal to an IF digital signal. The sampling rate is intended to be below the Nyquist rate in order to force aliased copies of the IF signal (807) close to a lower digital IF, $f_2$.
3. Digital filters (813) which reject noise and interference outside of the digital IF bandwidth.
4. A Digital Down Converter (DDC) (804) which converts the (real) digital IF signal to a (complex) digital baseband signal (optional).

In order to have low group delay variation, the following procedure is suggested:

Procedure III:

1. Estimate the carrier offset (818), (due to Doppler, $\delta f_i$, and due to LO offset, $\Delta f_i$) of the signal $r_i(t)$ (801) using Digital Signal Processor (DSP) (817).
2. Adjust the Local oscillators (808) in the receiver corresponding to the MR during reception of $r_i(t)$ (801) based on the estimated carrier offset (818), in step 2 above.

Explanation of Procedure III: Since the overall group delay, $\Delta t_i$, is a function of frequency, it can vary significantly from one frequency to another. Furthermore, according to the AMPs standard, $\Delta f_i$ can be as large as 2 kHz. For this reason, it is important to force $\Delta t_i$ to be independent of the carrier offset, $\Delta f_i + \delta f_i$. This is accomplished by estimating the carrier offset, $\Delta f_i + \delta f_i$, in step 1 of Procedure III and removing it in step 2 of Procedure III prior to processing it for location purposes. In other words, steps 1 and 2 force the overall group delay, $\Delta t_i$, to remain constant, thereby reducing overall group delay variations due to frequency offsets. In order to reduce overall group delay variations due to temperature and aging in the RR, a calibration procedure has to be performed on a regular basis on the RR.

Notes:

1. In Procedure III, step 1 can be performed using a discrete Carrier Recovery Loop (CRL) described in Procedure IV (see below).
2. In Procedure III, step 2 can be performed using a Direct Digital Synthesiser (DDS) (809).

The discrete Carrier Recovery Loop consists of several steps that are repeated a number of times until a satisfactory level of performance is reached:

Procedure IV:

1. Digitally Signal Process the sampled IF signal (814 or 816) using the DSP (817) in order to derive an adequate objective function, $f_{obj}$.
2. If $f_{obj}$ is optimized to within a certain constraint, stop the loop, otherwise:
3. search for a new frequency offset (818),
4. adjust the LO (808) by the new frequency offset (818), and
5. go back to step 1.

In Procedure IV, step 3 can be performed using a gradient-type search algorithm or any other suitable search algorithm.

In Procedure IV, step 4 can be performed using either a DDS (809) only or a DDS and a Digital Down-Converter (DDC) (815). If a DDS (815) only is used in step 4, then step 1 in Procedure IV processes a new segment of the signal, $r_i(t)$, every interation. If a DDS (809) and a DDC (809) are used in step 4, then step 1 in Procedure IV processes the same stored segment of the signal, $r_i(t)$, every iteration until the DDS (809) is used. It is preferred to use both the DDC and the DDS in order to reduce the effect of finite precision arithmetic on the estimation process.

In the case when Design I does not contain step 4, the DSP (817) in step 1 of Procedure IV of the carrier recovery loop can consist of a digital notch filter centered at the desired IF frequency $f_2$, whose power of response is to be minimized, i.e. $f_{obj}$ is the response of the digital notch filter. In this case, the notch filter can consist of 1. a first digital Band Pass Filter centered at the $f_2$+frequency of desired Tone; and
2. a second digital Band Pass Filter centered at the $f_2$−frequency of desired Tone.

The Band Pass filters can be implemented using (real) digital Biquadratic filters.

Alternatively, the DSP (817) in step 1 in Procedure IV of the carrier recovery loop can consist of a digital Band Pass Filter centered at the desired IF frequency $f_2$, whose power of response is to be maximized, i.e. $f_{obj}$ is the response of the Band Pass Filter. In this case, the BPF can be implemented as a (complex) $1^{st}$ order (or higher) digital IIR filter.

In the case when Design I contains step 4, the signal to process is a baseband signal (816) and the digital BPF turns into a simple (complex) LPF. An example of such a LPF is an averaging filter which adds all real samples together and all imaginary samples together over the observation interval.

In order to reduce the effect of clock errors and LO offset (or drift), $\Delta f_i$, a common reference is used for all the LOs and for all the clocks. A suitable common reference for the LOs and for the clocks can be derived from the GPS signal.

Given that either all LOs in the BSTs have a common reference, which implies that $\Delta f_1 = \Delta f_2 = \Delta f_3 = \Delta f$ in equations (32), or that the RR estimates $\Delta f_1$, $\Delta f_2$, $\Delta f_3$ in order for them to be removed, it is possible to estimate the speed, v, with respect to the BSTs and Direction Of Travel (DOT), $\phi$, of the MR from the carrier offsets that are estimated from Procedure V at each BS using the discrete carrier recovery loop. This can be accomplished using the Frequency Difference of Arrival (FDOA) between each pair of BS as expressed in equations (33).

Calibration methods at the RR

It is preferred to minimize the use of the RRs in order to reduce cost and complexity of a handset-based WLS. It is desired to produce a handset-based Wireless Location System (WLS) where an MR can be located without the need for an RR. This is achieved by considering a transmitter in an existing cellular sector as a BST. The advantage is that such a sector is usually time-referenced to other sectors belonging to the same BST, i.e. sectors in the same BS are more or less synchronized to one another. This implies that the MR can estimate the AOA of signals transmitted by such sectors without a need for an RR. Moreover, the MR can estimate its location using only two independent BSs based on the individual estimated AOA from each BS without the need for an RR.

A wireless location system has to be calibrated prior to operation (and occasionally during operation) in order to remove the effect of the overall Group Delay, $\Delta t_j$, at each RR. Moreover, temperature and aging can cause the overall Group Delay to change with time. Therefore, it is necessary to calibrate the RR on a regular basis. A method to calibrate an RR is as follows:

Procedure V:
1. transmitting at precise time intervals signals from a transmitter of known location to the RR over several frequency bands. Both the RR and the transmitter have to be referenced to the same clock source;
2. characterizing the frequency response of the RR;
3. estimating the time of travel between the transmitter and the RR;
4. estimating the group delay of the RR.

Procedure V can be repeated a number of times in order to average the relative group delay over time. In order to reduce deployment cost of a transmitter at known locations, an MR is stored in proximity to the RR. This allows for automatic calibration without a need for human intervention by forcing the MR to act as a transmitter.

In order to minimize the relative group delay variations between calibration intervals, it is recommended to use SAW filters as the BPF (803, 805, 811) in FIG. 8. It is also recommended to place the SAW filters (803, 805, 811) in a metallic block to minimize flexing effects due to temperature variations.

Host Software

Given a number of positioning algorithms and a number of methods for blunder detection, positioning strategy is used as illustrated in FIGS. 9a, 9b, 9c and 9d. FIGS. 9 illustrate the preferred embodiment for adjusting the observed TOAs such that the sum of the squares of the residuals is a minimum. Other methods for adjusting the observed according to some optimization criteria are available including:

General Minimum Variance Unbiased Estimation,
Best Linear Unbiased Estimation
Maximum Likelihood Estimation,
Method of Moments,
General Bayesian Estimation,
Linear Bayesian Estimation,
Kalman Filtering, etc.

The positioning process begins with a set of TOA observations from a minimum of three BSs. If only three TOAs are available (901), solution bifurcation is tested for (902). In the event of solution bifurcation, the LOCA algorithm (903) is performed on the TOA observations yielding two solutions. These two solutions are each used as the initial position for Least Squares (904 and 905) resulting in two Least Squares solutions for the MR. The Least Squares algorithm here, and in all other parts of FIG. 9, is Hybrid TDOA positioning with received signal strength used to weight the individual BS observations. During every iteration of Least Squares, misclosures for each BST are calculated. If any misclosure exceeds some multiple of the RMS value of the entire set of misclosures, the corresponding BST, and its TOA, is no longer used within that particular execution of Least Squares.

If both Least Squares solutions (904 and 905) converge (906) but are not equal (907), it is assumed that Least Squares has converged to the two possible solutions and both Least Squares solutions are reported as possible positions for the MR (908). If the either of the LS solutions diverge (906) or the convergent solutions are equal (907), the two LOCA solutions from (903) are reported as possible positions of the MR (909).

If at (902) bifurcation is found to not exist, LOCA is again executed (910) but yields only one solution. This solution is used as the initial position in Least Squares (911).

When redundancy does exist (901), Plane Intersection (912) (or any other closed-form position estimation algorithm) is executed. The resulting solution is used as the initial position for Least Squares (913). At this point a check is made as to whether Least Squares (913 or 911) converged (914). If Least Squares converges, another check for observational redundancy is made (915). If there is no redundancy, the Least Squares solution is reported as the position estimate of the MR (923). If there is redundancy, the normalized residuals are statistically tested for normality (916). The Least Squares solution is reported (923) should all residuals pass. If any residuals fail, the redundancy numbers of the failing observations are checked (917). The redundancy number of the $i^{th}$ observation is defined as $$g_i = (C_r C_1^{-1})_{ii} \tag{52}$$

where $C_r$ is the covariance matrix of the residuals and is defined as $$C_r = C_1 - A[A^T C_1^{-1} A]^{-1} A^T. \tag{53}$$

Should all failing observations have redundancy numbers less than some threshold (preferably, this threshold is 0.5), the Least Squares solution is reported as the MR position estimate (923).

If observations with failing residuals have redundancy numbers larger than the threshold (917), that observation with redundancy number greater than the threshold and with the largest standardized residual is permanently removed from the observation set (928). The initial position used for the previous execution of Least Squares is remembered (929) and used again in Least Squares with the truncated observation data set (930 or 931).

Should Least Squares now diverge (932), the previous Least Squares solution which did converge is reported as the position estimate of the MR (936). If Least Squares does converge (932), and there is no redundancy (933), the newly convergent Least Squares solution is reported (936). If there is redundancy (933), the standardized residuals are tested for normality (934). Should all the residuals pass, the newly convergent Least Squares solution is reported (936). Otherwise, if all failing observations have redundancy numbers less than some threshold (preferably, this threshold is 0.5), the newly convergent Least Squares solution is reported (936).

If observations with failing residuals have redundancy numbers larger than the threshold (935), that observation with redundancy number greater than the threshold and with the largest standardized residual is permanently removed from the observation set (928). The process then continues as described immediately above.

If at (914) Least Squares diverges, Least Squares is executed again but with the average of participating BSTs coordinates used as the initial position (918). If Least Squares now converges (919) but there is no observation redundancy (920), the newly convergent Least Squares solution is reported as the position estimate of the MR (923). If there is redundancy (920), the standardized residuals are tested for normality (921). Should all residuals pass, the newly convergent Least Squares solution is reported (923). If some of the residuals fail but none of the corresponding observations have redundancy numbers greater than some threshold (922), the newly convergent Least Squares solution is reported (923).

If observations with failing residuals have redundancy numbers larger than the threshold (922), that observation with redundancy number greater than the threshold and with the largest standardized residual is permanently removed from the observation set (928). The process then continues from (928) as described above.

When Least Squares does not converge at (919), and there is no redundancy (924), either no solution is reported for this particular set of observation data or the solution from the last iteration before divergence is reported (927). If there is redundancy, but all of the standardized residuals pass the normality test (925), no solution is reported for this particular set of observation data or the solution from the last iteration before divergence is reported (927). Should some of the residuals fail, the observation with the largest standardized residual is permanently removed from the data set regardless of its redundancy number. The process then begins at point (912) as described above.

FIGS. 9 are also applicable for,
AOA positioning,
AOA/TDOA positioning, and
AOA/Range positioning.

Transferring Location Information of the MR over the Internet

Given that the Internet is global and inexpensive, the communication between the Host and the customer can be achieved over it. For example when a MR calls 911 for emergency, it is possible to relay the positional information of the MR from the Host to the PSAP over the internet. Similarly, in the case when a powered-on MR is to be located by a customer, its positional information can be relayed from the Host to the customer through the internet.

The utility of the internet in its capacity of transferring MR location information on a global scale, extends the application of the wireless location system beyond the cellular network for which the BSTs have been deployed. Through the latest internet technology such as Java, JavaBeans, as well as CORBA (Common Object Request Broker Architecture), MR location information residing at the Host can be integrated with third-party information (i.e. a map database, or a database consisting of geo-coded business addresses such as restaurants, towing companies, etc.) residing in some other geographical location, perhaps even in another country. The combination of this MR location information with the third party information can be transferred over the internet to allow customers to locate a particular MR wrt to either a map location (i.e. street address) and/or a business location, provided that the MR is within network coverage for the wireless location system. Through this process the MR location information and the third party database information can be accessed or "served up" to the customer through efficient Java Internet technology processes. The service provider will integrate together the various components including the MR location information derived from the wireless location system and the third-party information database. The integration process of the different databases is transparent to the customer. The customer will only know that the location-based service exists as such to bring all of the different components together to provide for a complete service which can be offered either on a regional, national or perhaps global basis. Through the internet these location-based services can now be offered on an economical basis to the customer. Examples of such services are fleet management, concierge services, roadside assistance, child find services, etc. Legality and security aspects are a concern on the internet and in some cases a dedicated link may be necessary.

A clean replica referred to herein is a copy of a signal that is not noisy, as for example may be obtained by a stored version of the signal transmitted. Low group delay variation preferably means a few 10s of nanoseconds of group delay. An adequate objective function is a function known in the literature, for example minimizing the means squared error. A PSAP is a public safety answering point, for example a 911 station. An RSSI is a receiver signal strength indicator.

Every document referred to herein as containing useful information for implementing MR location is incorporated herein by reference.

Modifications to the preferred embodiments disclosed may occur to those skilled in the art without departing from the scope of the invention.

We claim:

1. A method of estimating the location of a mobile receiver from a plurality of signals transmitted from a plurality of base stations, the method comprising the steps of:
    making a set of observations of the signals;
    using misclosures and/or standardized residuals to flag observations that might contain a blunder; and
    estimating the location of the mobile receiver by performing a location estimation process on the set of observations.

2. The method of claim 1 in which location information from each base station is weighted based on its corresponding received signal strength and wherein a method selected from the group consisting of the following methods is used for the location estimation process:
    General Minimum Variance Unbiased Estimation,
    Best Linear Unbiased Estimation,
    Maximum Likelihood Estimation,
    Least Squares Estimation,
    Method of Moments,
    General Bayesian Estimation,
    Linear Bayesian Estimation, and Kalman Filtering; and
  removing observations that might contain a blunder from the set of observations used in the location estimation process.

3. The method of claim 1 in which Least Squares is used to solve for the positional information of the mobile receiver and where the number of base stations used in locating the mobile receiver is optimized.

4. The method of claim 3 where the optimization of the number of base stations used in locating the mobile receiver is accomplished based on minimizing horizontal dilution of precision while maximizing the average received signal strength from all base stations.

5. The method of claim 1 in which Least Squares is used in the location estimation process, and least squares comprises a closed-form algorithm to provide an accurate initial position to start the Least Squares iterative process.

6. The method of claim 5 where the closed-form algorithm is selected from the group consisting of LOCA, Plane Intersection, Bancroft's method, spherical interpolation, Schau and Robinson's method and Chan and Ho's method to provide an accurate initial position to start the Least Squares iterative process.

7. The method of claim 5 in which the mean coordinates of the participating base stations are used as the initial position for Least Squares in the event that the closed-form causes Least Squares to diverge.

8. The method of claim 1 wherein a method selected from the group consisting of the following methods is used for the location estimation process:
  General Minimum Variance Unbiased Estimation,
  Best Linear Unbiased Estimation,
  Maximum Likelihood Estimation,
  Least Squares Estimation,
  Method of Moments,
  General Bayesian Estimation,
  Linear Bayesian Estimation, and
  Kalman Filtering; and
    removing observations that might contain a blunder from the set of observations used in the location estimation process.

9. The method of claim 1 in which least squares is used in the location estimation process and wherein the flagged observations are either discarded or kept in the least squares solution based on their effect on the total residuals of the least squares solution and their individual redundancy number.

10. The method of claim 9 where Least Squares is repeated without the flagged observations.

11. The method of claim 10 where newly flagged observations are removed and Least Squares repeated until Least Squares converges or no more redundant observations exist.

12. The method of claim 1 which uses a method selected from the group consisting of Chaffee's method and LOCA to detect solution bifurcation during performance of the location estimation process.

13. The method of claim 12 where two estimates of the mobile receiver position are provided in the event that solution bifurcation does exist and there is no observational redundancy.

14. The method of claim 1 in which the observations are time difference of arrival observations and, a hybrid time difference of arrival positioning model, which yields misclosures and residuals for the individual base stations, is used, in which a base station is selected as a reference base station and time differences of arrival are computed with time of arrival at the reference base station as a reference.

15. The method of claim 14 wherein a method selected from the group consisting of the following methods is used for the location estimation process:
  General Minimum Variance Unbiased Estimation,
  Best Linear Unbiased Estimation,
  Maximum Likelihood Estimation,
  Least Squares Estimation,
  Method of Moments,
  General Bayesian Estimation,
  Linear Bayesian Estimation, and
  Kalman Filtering; and
    observations that might contain a blunder are removed from the set of observations used in the location estimation process.

16. The method of claim 1 in which the observations include angle of arrival observations and the effect of geometry on angle of arrival positioning is quantified using a dilution of precision design matrix for angle of arrival positioning.

17. The method of claim 1 in which the observations include angle of arrival and time difference of arrival observations and the effect of geometry on position estimation is quantified using a dilution of precision design matrix for angle of arrival and time difference of arrival positioning.

18. The method of claim 1 in which the observations include angle of arrival and range observations and in which the effect of geometry on speed and direction of travel estimation is quantified using a design matrix for angle of arrival and range positioning.

19. The method of claim 1 where the observations are selected from the group consisting of time of arrival, phase of arrival and frequency of arrival observations.

20. A system to estimate the location of a mobile receiver from a plurality of signals transmitted from a plurality of base stations, the system comprising:
  a receiver for making observations of the signals; and
  a processor for estimating the location of the mobile receiver by performing a location estimation process on the set of observations, the processor being configured to use misclosures and/or standardized residuals to flag observations that might contain a blunder.

21. The system of claim 20 in which the processor uses a method selected from the group consisting of Chaffee's method and LOCA to detect solution bifurcation.

22. The system of claim 20 in which the processor uses a hybrid time difference of arrival positioning model, which yields misclosures and residuals for the individual base stations, and in which a base station is selected as a reference base station and time differences of arrival are computed with time of arrival at the reference base station as a reference.

23. The system of claim 20 in which the processor uses Least Squares in the location estimation process and where the number of base stations used in locating the is optimized.

24. The system of claim 20 in which the processor uses Least Squares, as the location estimation process, the processor implementing a closed-form algorithm to provide an accurate initial position to start the Least Squares iterative process.

25. The system of claim 20 in which the processor uses the mean coordinates of the participating base stations as the initial position for Least Squares in the event that a closed-form algorithm causes Least Squares to diverge.

26. The system of claim 20 in which the processor quantifies the effect of geometry on angle of arrival positioning using a dilution of precision design matrix for angle of arrival positioning.

27. The system of claim 20 in which the processor quantifies the effect of geometry on position estimation, with both angle of arrival and time difference of arrival observations, using a dilution of precision design matrix for angle of arrival and time difference of arrival positioning.

28. The system of claim 20 in which the processor quantifies the effect of geometry on speed and direction of travel estimation using a dilution of precision design matrix for angle of arrival and range positioning.

29. The system of claim 20 in which location information from each base station is weighted based on its corresponding received signal strength and wherein the system is configured to carry out a method selected from the group consisting of the following methods as the location estimation process:

General Minimum Variance Unbiased Estimation,
Best Linear Unbiased Estimation,
Maximum Likelihood Estimation,
Least Squares Estimation,
Method of Moments,
General Bayesian Estimation,
Linear Bayesian Estimation, and
Kalman Filtering.

* * * * *

UNITED STATES PATENT AND TRADEMARK OFFICE
CERTIFICATE OF CORRECTION

PATENT NO. : 6,266,014 B1  
DATED : July 24, 2001  
INVENTOR(S) : M. Fattouche et al.

Page 1 of 1

It is certified that error appears in the above-identified patent and that said Letters Patent is hereby corrected as shown below:

<u>Title page,</u>
Item [56] References Cited OTHER PUBLICATIONS, "Telepohone" should read -- Telephone --

<u>Column 44,</u>
Item 56, "locating the is optimized." should read -- locating the mobile receiver is optimized. --

Signed and Sealed this

Twenty-first Day of May, 2002

Attest:

Attesting Officer

JAMES E. ROGAN  
Director of the United States Patent and Trademark Office